United States Patent
Satomi et al.

(10) Patent No.: US 7,433,916 B2
(45) Date of Patent: Oct. 7, 2008

(54) SERVER APPARATUS AND CONTROL METHOD THEREFOR

(75) Inventors: Hiroshi Satomi, Kanagawa (JP); Satoshi Igeta, Kanagawa (JP); Atsushi Inoue, Tokyo (JP); Satoshi Watanabe, Tokyo (JP); Kenichiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/254,573

(22) Filed: Sep. 26, 2002

(65) Prior Publication Data

US 2003/0065807 A1    Apr. 3, 2003

(30) Foreign Application Priority Data

Sep. 28, 2001 (JP) ............................. 2001-300586

(51) Int. Cl.
*G06F 15/16* (2006.01)
(52) U.S. Cl. .................. 709/203; 709/218; 709/226; 707/7; 710/33
(58) Field of Classification Search ................ 709/220, 709/227, 228, 203, 206, 201, 224; 713/201; 707/501; 348/231, 211.3; 705/1, 26; 725/105
See application file for complete search history.

(56) References Cited

U.S. PATENT DOCUMENTS

| | | | | |
|---|---|---|---|---|
| 5,796,428 | A * | 8/1998 | Matsumoto et al. | 348/207.99 |
| 6,035,323 | A * | 3/2000 | Narayen et al. | 709/201 |
| 6,532,298 | B1 * | 3/2003 | Cambier et al. | 382/117 |
| 6,606,413 | B1 * | 8/2003 | Zeineh | 382/232 |
| 6,636,259 | B1 * | 10/2003 | Anderson et al. | 348/211.3 |
| 6,665,425 | B1 * | 12/2003 | Sampath et al. | 382/112 |
| 6,810,386 | B1 * | 10/2004 | Yurino et al. | 705/36 R |
| 6,950,128 | B1 * | 9/2005 | Sawada | 348/231.3 |
| 6,950,800 | B1 * | 9/2005 | McIntyre et al. | 705/1 |
| 7,013,288 | B1 * | 3/2006 | Reifel et al. | 705/26 |
| 7,117,519 | B1 * | 10/2006 | Anderson et al. | 725/105 |
| 2001/0013055 | A1 * | 8/2001 | Kojima et al. | 709/205 |
| 2001/0015751 | A1 * | 8/2001 | Geng | 348/36 |
| 2002/0029242 | A1 * | 3/2002 | Seto | 709/203 |
| 2002/0184318 | A1 * | 12/2002 | Pineau | 709/206 |

FOREIGN PATENT DOCUMENTS

WO    01/01267    1/2001

OTHER PUBLICATIONS

U.S. Appl. No. 10/254,516, filed Sep. 26, 2002.
U.S. Appl. No. 10/254,526, filed Sep. 26, 2002.
U.S. Appl. No. 10/254,518, filed Sep. 26, 2002.
U.S. Appl. No. 10/254,675, filed Sep. 26, 2002.
U.S. Appl. No. 10/254,570, filed Sep. 26, 2002.

* cited by examiner

*Primary Examiner*—Khanh Dinh
(74) *Attorney, Agent, or Firm*—Fitzpatrick, Cella, Harper & Scinto

(57) ABSTRACT

A server apparatus which accepts the transfer of image data from a user who can access the apparatus through a network, and can limit image data whose transfer is accepted with various conditions is disclosed. The server apparatus according to this invention determines whether given image data is data that can be received, in accordance with the type of image input device contained in the additional information of the image data and the presence/absence of data such as photographing conditions and the like, thereby receiving only images photographed by specific input devices or rejecting images containing no information required for printing.

7 Claims, 32 Drawing Sheets

CUSTOMER STATE DATA TABLE    500

| ITEM | TYPE | |
|---|---|---|
| USER ID | INTEGER TYPE | 501 |
| LASTLY DISPLAYED ALBUM ID | INTEGER TYPE | 502 |
| MAXIMUM DISK CAPACITY | INTEGER TYPE | 503 |
| CUMULATIVE POINT | INTEGER TYPE | 504 |
| MODEL ID OF DIGITAL CAMERA TO BE MAINLY USED | INTEGER TYPE | 505 |

FIG. 3

CUSTOMER INFORMATION DATA TABLE                    400

| ITEM | TYPE | |
|---|---|---|
| USER ID | INTEGER TYPE | ~401 |
| DESTINATION E-MAIL ADDRESS | CHARACTER TYPE 64 BYTES | ~402 |
| Login Name | CHARACTER TYPE 64 BYTES | ~403 |
| Password | CHARACTER TYPE 64 BYTES | ~404 |
| NAME(LAST NAME) | CHARACTER TYPE 64 BYTES | ~405 |
| NAME(FIRST NAME) | CHARACTER TYPE 64 BYTES | ~406 |
| PHONETIC TRANSCRIPTIONS IN KANA (LAST NAME) | CHARACTER TYPE 64 BYTES | ~407 |
| PHONETIC TRANSCRIPTIONS IN KANA (FIRST NAME) | CHARACTER TYPE 64 BYTES | ~408 |
| ZIP CODE 1 | CHARACTER TYPE 8 BYTES | ~409 |
| ZIP CODE 2 | CHARACTER TYPE 8 BYTES | ~410 |
| MUNICIPAL DIVISION CODE | INTEGER TYPE | ~411 |
| ADDRESS 1 | CHARACTER TYPE 256 BYTES | ~412 |
| ADDRESS 2 | CHARACTER TYPE 256 BYTES | ~413 |
| TELEPHONE NUMBER 1 | CHARACTER TYPE 8 BYTES | ~414 |
| TELEPHONE NUMBER 2 | CHARACTER TYPE 8 BYTES | ~415 |
| TELEPHONE NUMBER 3 | CHARACTER TYPE 8 BYTES | ~416 |
| USER REGISTRATION STATE | INTEGER TYPE | ~417 |

FIG. 4

CUSTOMER STATE DATA TABLE 500

| ITEM | TYPE | |
|---|---|---|
| USER ID | INTEGER TYPE | ~501 |
| LASTLY DISPLAYED ALBUM ID | INTEGER TYPE | ~502 |
| MAXIMUM DISK CAPACITY | INTEGER TYPE | ~503 |
| CUMULATIVE POINT | INTEGER TYPE | ~504 |
| MODEL ID OF DIGITAL CAMERA TO BE MAINLY USED | INTEGER TYPE | ~505 |

FIG. 5

CUSTOMER ALBUM DATA TABLE                              600

| ITEM | TYPE |
|---|---|
| USER ID | INTEGER TYPE |
| ALBUM ID | INTEGER TYPE |
| ALBUM DISPLAY ORDINAL NUMBER | INTEGER TYPE |

ALBUM INFORMATION DATA TABLE 700

| ITEM | TYPE |
|---|---|
| ALBUM ID | INTEGER TYPE |
| ALBUM NAME | CHARACTER TYPE 64 BYTES |
| COMMENT(FILE PATH) | CHARACTER TYPE 256 BYTES |
| DISCLOSURE PERMISSION/INHIBITION | INTEGER TYPE |
| PASSWORD PERMISSION/INHIBITION | INTEGER TYPE |
| ALBUM PASSWORD | CHARACTER TYPE 64 BYTES |
| PRINT PERMISSION/INHIBITION | INTEGER TYPE |
| ORIGINAL IMAGE DISPLAY PERMISSION/INHIBITION | INTEGER TYPE |
| DISPLAY FORM NUMBER | INTEGER TYPE |

ALBUM IMAGE DATA TABLE    800

| ITEM | TYPE | |
|---|---|---|
| ALBUM ID | INTEGER TYPE | 801 |
| IMAGE ID | INTEGER TYPE | 802 |
| IMAGE DISPLAY NUMBER | INTEGER TYPE | 803 |

FIG. 8

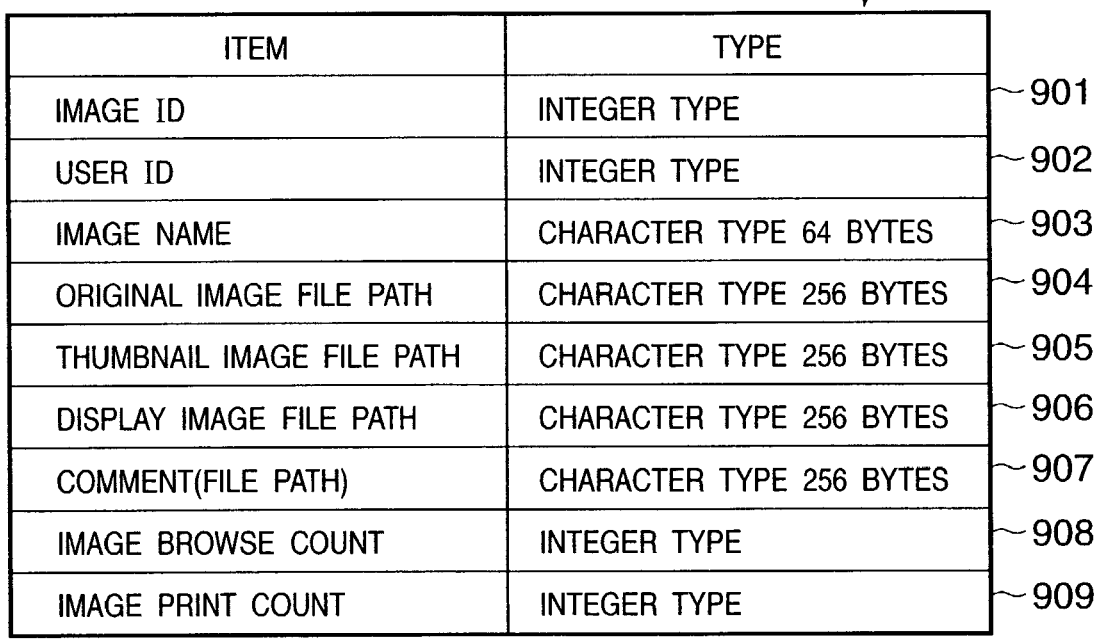

IMAGE INFORMATION DATA TABLE

| ITEM | TYPE | |
|---|---|---|
| IMAGE ID | INTEGER TYPE | ~901 |
| USER ID | INTEGER TYPE | ~902 |
| IMAGE NAME | CHARACTER TYPE 64 BYTES | ~903 |
| ORIGINAL IMAGE FILE PATH | CHARACTER TYPE 256 BYTES | ~904 |
| THUMBNAIL IMAGE FILE PATH | CHARACTER TYPE 256 BYTES | ~905 |
| DISPLAY IMAGE FILE PATH | CHARACTER TYPE 256 BYTES | ~906 |
| COMMENT(FILE PATH) | CHARACTER TYPE 256 BYTES | ~907 |
| IMAGE BROWSE COUNT | INTEGER TYPE | ~908 |
| IMAGE PRINT COUNT | INTEGER TYPE | ~909 |

FIG. 9

DIGITAL CAMERA MODEL INFORMATION LIST 7900

| MODEL ID | MODEL NAME | NUMBER OF PIXELS | STANDARD IMAGE SIZE |
|---|---|---|---|
| 0 | NONE | 0 | 500KB |
| 1 | MODEL A | 350,000 | 80KB |
| 2 | MODEL B | 800,000 | 225KB |
| 3 | MODEL C | 1,300,000 | 360KB |
| 4 | MODEL D | 2,100,000 | 600KB |
| . | . | . | . |
| . | . | . | . |
| . | . | . | . |
|  |  |  |  |

FIG. 12

USER REGISTRATION WINDOW FOR PHOTOSITE — 2100

E-MAIL ADDRESS : — 2101
Login Name : — 2102
PASSWORD : — 2103

NAME — 2104
LAST NAME : — 2105  FIRST NAME : — 2107
PHONETIC TRANSCRIPTIONS IN KANA — 2106
LAST NAME :  FIRST NAME :

ADDRESS — 2108
〒 : 2109 — 2110  MUNICIPAL DIVISION : — 2111
CITY/DISTRICT/TOWN/VILLAGE NAME, TOWN NAME/STREET NUMBER, etc.:
APARTMENT/CONDOMINIUM NAME, ROOM NUMBER, etc.: — 2112

TELEPHONE NUMBER — 2114
2115 — 2113

MODEL NAME OF DIGITAL CAMERA WHICH IS MAINLY USED
MODEL A — 2118

REGISTER — 2116   CANCEL — 2117

USER INFORMATION CONFIRMATION WINDOW

MR. TARO KIYANON
YOU ARE REGISTERED IN SITE

YOUR LOGIN NAME IS △△△△@◇◇◇◇.ne.jp

REGISTERED CONTENT IS
DESTINATION E-MAIL ADDRESS : △△△△@◇◇◇◇.ne.jp
ADDRESS : 〒AAA-BBBB ○○CHO 1-1-2, ○○KU, TOKYO
TELEPHONE NUMBER : 03-XXXX-XXXX

PLEASE NOTE THAT THE ABOVE INFORMATION IS ALSO SENT TO YOUR DESTINATION E-MAIL ADDRESS

[CONFIRM] — 2601

[CORRECT] — 2602

FIG. 18

```
Date : Sat. 23 Jun 2001 12:13:37 +0900
Date : Site (×××@○○○.com)
To : △△△△@◇◇◇◇.ne.jp
Subject : [USER REGISTRATION CONFIRMATION] YOU ARE REGISTERED
Content-Type : text/plain ; charset="ISO-2022-JP"
Content-Transfer-Encoding : 7bit

MR. TARO KIYANON

YOU ARE REGISTERED IN SITE

YOUR LOGIN NAME IS △△△△@◇◇◇◇.ne.jp

REGISTERED CONTENT IS
DESTINATION E-MAIL ADDRESS : △△△△@◇◇◇◇.ne.jp
ADDRESS : 〒AAA-BBBB ○○CHO 1-1-2, ○○KU, TOKYO
TELEPHONE NUMBER : 03-XXXX-XXXX

IF YOU DID NOT REGISTER, PLEASE CONTACT XXX-support@○○○.com
```

SERVER APPARATUS AND CONTROL METHOD THEREFOR

FIELD OF THE INVENTION

The present invention relates to a server apparatus which receives the image data transferred from a user who can access the apparatus through a network and provides the user with a predetermined service using the received image data, and a control method for the apparatus.

BACKGROUND OF THE INVENTION

Recently, with improvements in communication environments and advances in information communication techniques, information providing services and information using services which use computer networks such as the Internet can be provided. In multimedia environments in which all data, e.g., text data, image data, and sound data, are digitized, in particular, since information can be shared and provided, many information providing services have been offered through the Internet.

Creating the image input by a digital camera or scanner as electronic data and storing the data in a recording medium such as an HDD, CD-R, or the like of a personal computer have already become general operations.

As described above, with rapid improvements in Internet connection environments (improvements in communication environment and the function of connection devices and reductions in cost), there have appeared application service providers (to be referred to as photosites hereinafter) which provide services like keeping the image data photographed by users using image input devices in storage areas in servers on the Internet and allowing the users to browse the image data again at the time they require it or processing the image data, and print service providers (to be referred to as printsites hereinafter) which provide services of printing electronic documents such as the New Year's cards, wordprocessed documents, and images.

At the beginning, many of photosites were run by the profits accrued from print services ordered to printsites annexed to the photosites while keeping image data from users free. Recently, however, since it takes an enormous cost to maintain and manage image data, photosites and printsites have become separated from each other. More specifically, photosites that require much cost are managed by makers of image input devices such as digital cameras, whereas printsites are managed by specialized companies.

As described above, since considerable expenditures are required to manage photosites, when a maker of image input devices manages such a photosite, the maker wants to avoid bearing the expenses for the management of image data input by image input devices manufactured by other makers.

When the image data photographed by an image input device, especially a digital camera, is to be printed at a printsite, the photographing condition data embedded in the image data at the time of photographing is often used to obtain a high-quality output. In some cases, therefore, image data containing no photographing condition data cannot be properly printed. For this reason, at a photosite, in accepting the upload (transfer) of image data from users, it is necessary to suppress the upload of image data containing no photographing condition data and limit the use of the site to only images that can be properly printed.

SUMMARY OF THE INVENTION

The present invention has been made in consideration of the above problems in the prior art, and has as its object to provide a server apparatus which accepts the transfer of image data from a user who can access the apparatus through a network, and a control method for the apparatus, and more specifically, a server apparatus which can limit image data whose transfer is accepted with various conditions, and a control method for the apparatus.

To achieve the above object, according to an aspect of the present invention, a server apparatus which receives image data transferred through a network and provides a predetermined service using the received image data is characterized by comprising: image data information analysis means for analyzing additional information in the transferred image data; and determination means for determining whether the image data is set as a target for the predetermined service, depending on the analysis result obtained by the analysis means.

To achieve the above object, according to another aspect of the present invention, a network system is characterized by using a server apparatus which receives image data transferred through a network and provides a predetermined service using the received image data, characterized by the server apparatus comprises: image data information analysis means for analyzing additional information in the transferred image data; and determination means for determining whether the image data is set as a target for the predetermined service, depending on the analysis result obtained by the analysis means.

To achieve the above object, according to a further aspect of the present invention, a control method for a server apparatus which receives image data transferred through a network and provides a predetermined service using the received image data is characterized by comprising: the image data information analysis step of analyzing additional information in the transferred image data; and the determination step of determining whether the image data is set as a target for the predetermined service, depending on the analysis result obtained in the analysis step.

To achieve the above object, according to a still further aspect of the present invention, a computer program is characterized by causing a computer apparatus to function as a server apparatus which receives image data transferred through a network and provides a predetermined service using the received image data, including: image data information analysis means for analyzing additional information in the transferred image data; and determination means for determining whether the image data is set as a target for the predetermined service, depending on the analysis result obtained by the analysis means.

To achieve the above object, according to another aspect of the present invention, a computer-readable storage medium is characterized by storing the computer program of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of the arrangement of a customer information data table managed by the photosite server according to the embodiment of the present invention;

FIG. 4 is a view showing an example of the arrangement of a customer state data table managed by the photosite server according to the embodiment of the present invention;

FIG. 5 is a view showing an example of the arrangement of a customer album data table managed by the photosite server according to the embodiment of the present invention;

FIG. 6 is a view showing an example of the arrangement of an album information data table managed by the photosite server according to the embodiment of the present invention;

FIG. 7 is a view showing an example of the arrangement of an album image data table managed by the photosite server according to the embodiment of the present invention;

FIG. 8 is a view showing an example of the arrangement of an image information data table managed by the photosite server according to the embodiment of the present invention;

FIG. 9 is a view showing an example of the arrangement of a digital camera model information list managed by the photosite server according to the embodiment of the present invention;

FIG. 12 is a view showing an example of the user registration window transmitted from the photosite server according to the embodiment of the present invention;

FIG. 17 is a view showing an example of the user registration confirmation window transmitted from the photosite sever in the user registration processing in FIG. 11;

FIG. 18 is a view showing an example of the contents of e-mail transmitted at the time of user registration in the user registration processing in FIG. 11;

DETAILED DESCRIPTION OF THE PREFERRED EMBODIMENTS

Preferred embodiments of the present invention will now be described in detail in accordance with the accompanying drawings.

The following embodiment will exemplify a server apparatus which forms the above photo sharing site on the Internet as an embodiment of the server apparatus according to the present invention. However, the present invention is not limited to server apparatuses which form photo sharing sites and can be applied to server apparatuses used for arbitrary purposes as long as they are designed to provide users with predetermined amounts of storage capacities. The computer network to which the server apparatus is connected is not limited to the Internet. It is, however, preferable that such a network be a computer network using a so-called Internet protocol group including TCP/IP and the like.

(Overall Arrangement)

Figure 1:
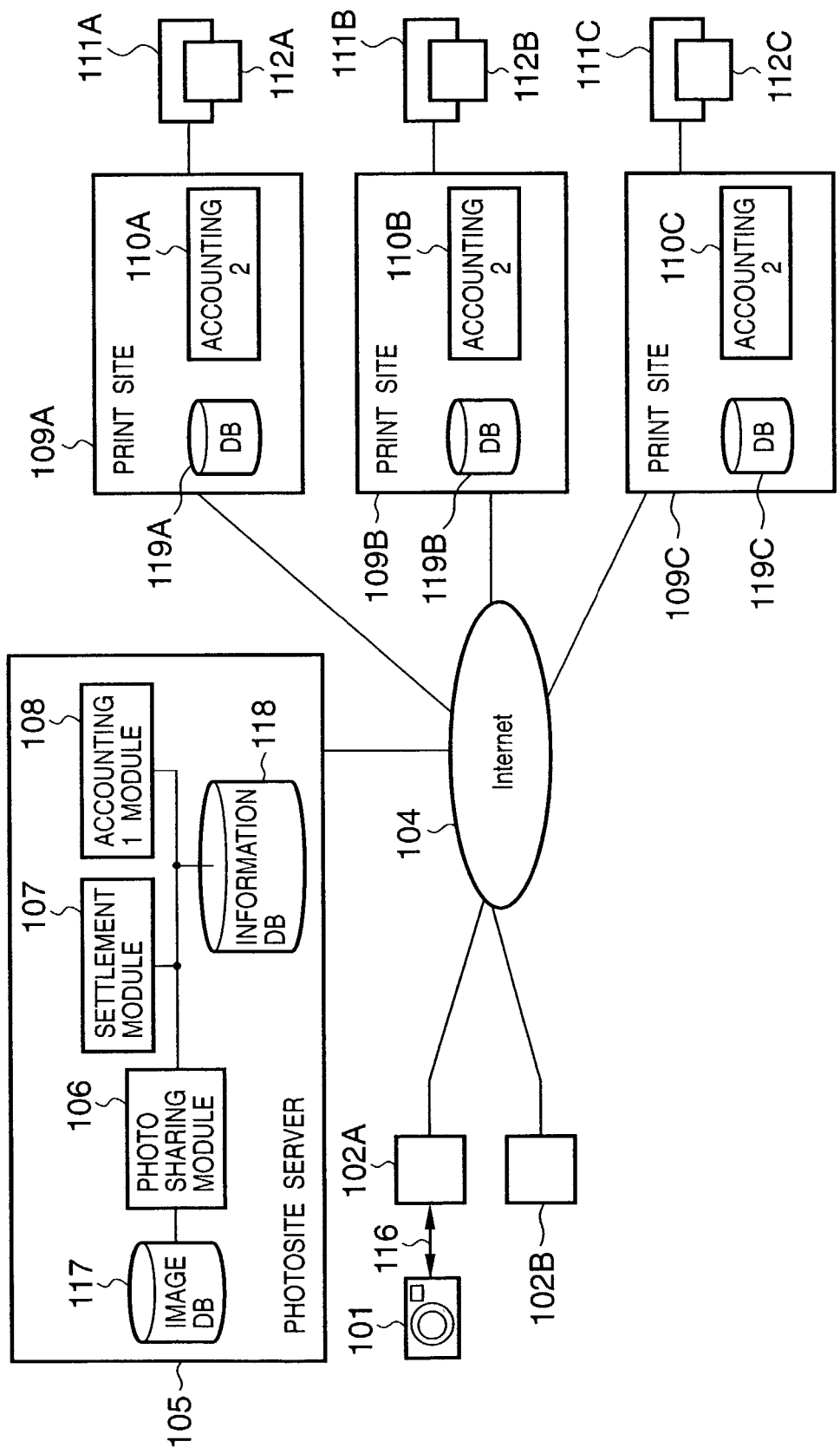
FIG. 1 is a block diagram showing an example of the overall arrangement of a network system using a photosite server according to an embodiment of the present invention.

FIG. 1 is a block diagram showing an example of the overall arrangement of a network system having a photo sharing site (photosite) using the server apparatus according to this embodiment.

Referring to FIG. 1, reference numeral 101 denotes an image input apparatus which is, for example, a digital still camera capable of photographing still images and recording the images as image data or a digital video camera capable of photographing moving images and recoding images as moving image data. This apparatus converts an optical image as image information into an electrical signal, performs predetermined image processing, and then records/reproduces the resultant information as digital information.

Reference numeral 102 denotes a computer device (to be referred to as a user PC hereinafter) such as a personal computer used by a user; and 116, a data transfer interface for transferring the image data photographed by the image input apparatus 101 between the image input apparatus 101 and the user PC 102. The data transfer interface 116 may be a wire interface represented by USB (Universal Serial Bus) or IEEE1394 or a wireless interface represented by IrDA or Bluetooth.

The image data photographed by the image input apparatus 101 and stored as digital information is transferred to a storage area in an information storage unit represented by the HDD (Hard Disc Drive) of the user PC 102. Image data transfer from the image input apparatus 101 to the user PC 102 is done in the following two cases. In the first case, in accordance with an instruction from the OS or dedicated software installed in the user PC 102, the image data stored in an information storage unit such as a memory or HDD in the image input apparatus 101 are transferred at once. In the second case, in response to the transfer command transmitted from the image input apparatus 101, the OS or dedicated software in the user PC 102 ensures a data recording area in the information storage unit in the user PC 102 and transfers the image data to the area.

A browser which operates on the user PC 102 and can execute a standard protocol (e.g., FTP or HTTP) capable of information transfer on the Internet 104 accesses a server apparatus (photosite server) 105, which forms a photo sharing site (photosite), by using a standard protocol such as HTTP (HyperText Transfer Protocol), loads/analyzes a file managed by the photosite server 105 and created by a description language such as HTML or XML, and further loads linked multimedia information such as image information and sound information, thereby displaying a Web page. With this operation, the user PC 102 can receive the services provided by the photosite server 105 through the Internet 104. As described later, in order to actually use the photosite server 105, user registration, authentication processing at the time of connection, and the like are required.

The image data photographed by the image input apparatus 101 and stored in the information storage unit in the user PC 102 is transferred to the photosite server 105 in accordance with a request from the user of the user PC 102 (this transfer will be referred to as image upload hereinafter). Image upload includes a case wherein image data to be transferred is selected with the above browser and transferred in synchronism with the action of requesting image upload and a case wherein image data is selected by using image upload software (TFP client software or the like), and the selected data is directly transferred by the image upload software.

In either case, image upload is executed on the basis of a file transfer protocol which can be used on the Internet, e.g., HTTP (RFC1867) or FTP. For this reason, a CGI (Common Gateway Interface) program, TFP server software, and the like which correspond to these protocols are also installed in a photo sharing module 106 in the photosite server 105.

The photo sharing module 106 checks whether uploaded image data is data that can be used in the photosite server 105. Upon determining that the data can be used, the photo sharing module 106 stores the uploaded image data in an image database 117, and the attribute information and the like of the image data in an information database 118. When these data are completely stored, the photo sharing module 106 notifies the user PC 102 that the image data has been properly uploaded.

In the information database 118, in addition to the attribute information of the image data described above, various data are unitarily managed, which include the user attribution information of the registered users of the photosite server 105, the attribute information of print service providers (to be referred to as printsites hereinafter) 109A to 109C who are requested the printing out of uploaded image data, and the like.

An arbitrary management method can be used for uploaded image data. Assume, however, that in this embodiment, a user creates "albums", and image data is registered in each album.

The user of the user PC 102 can browse the image data uploaded in this manner through the Web browser.

(Arrangements of Photosite Server 105 and User PC 102)

In this embodiment, the photosite server 105 and user PC 102 can be realized by general-purpose computers such as personal computers which can be connected to a computer network.

Figure 2:
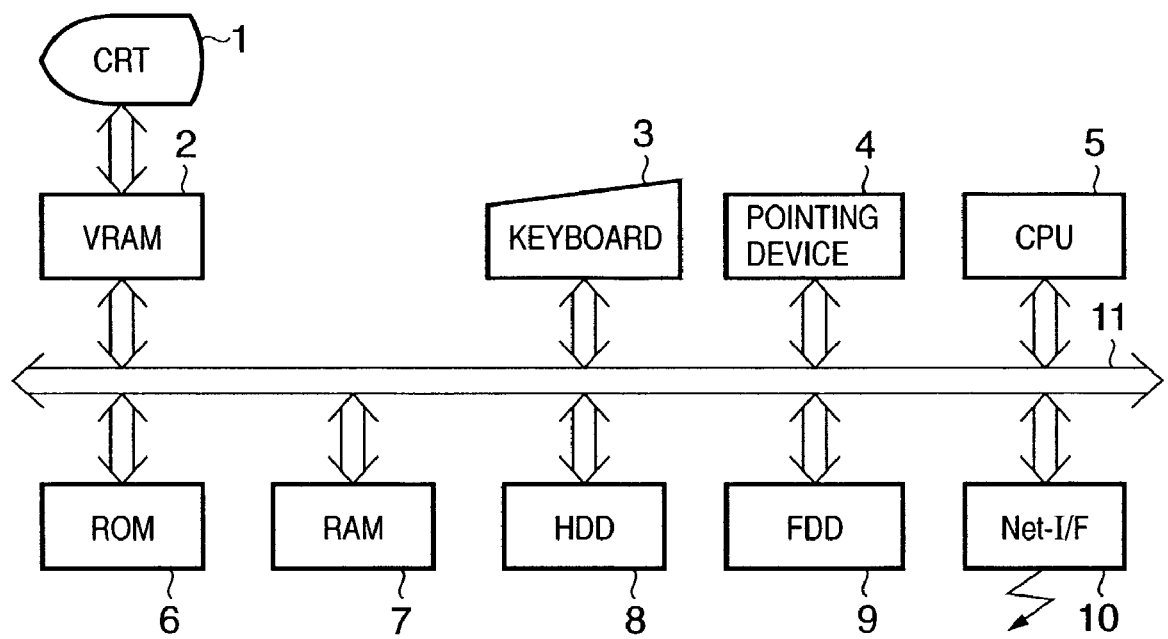
FIG. 2 is a block diagram showing an example of the arrangement of a computer apparatus which can be used as a photosite server or user PC according to the embodiment of the present invention.

FIG. 2 is a block diagram showing an example of the arrangement of a computer apparatus that can be used as the photosite server 105 or user PC 102 in this embodiment.

Referring to FIG. 2, reference numeral 1 denotes a CRT (Cathode Ray Tube) which displays the data that is being processed by an application program, various message menus, and the like; 2, a video RAM (to be referred to as a VRAM hereinafter) which bitmaps an image to be displayed on the screen of the CRT 1; 3 and 4, a keyboard and a pointing device, respectively, which are used to input characters and the like in predetermined columns on the screen and indicate icons, buttons, and the like on a GUI (Graphical User Interface); and 5, a CPU (Central Processing Unit) which performs overall control.

Reference numeral 6 denotes a ROM (Read Only Memory) in which the operation procedures (programs) executed by the CPU 5 are stored. Note that programs associated with the flow charts to be described later, including application programs associated with data processing and error processing programs, are also stored in the ROM 6. Reference numeral 7 denotes a RAM (Random Access Memory) which is used as a work area when the CPU 5 executes the various programs described above and a temporary save area for error processing.

Reference numeral 8 denotes a hard disc drive (to be referred to as an HDD hereinafter); and 9, a floppy disc drive (to be referred to as an FDD hereinafter). These disc drives are used storage areas for an OS, application programs such as a browser, data, libraries, and the like. In place of the FDD or in addition thereto, an optical (magnetic) disc drive such as a CD-ROM, MO, or DVD, a magnetic tape drive such as a tape streamer or DDS, or the like may be used.

Reference numeral 10 denotes a network interface which is used to connect the apparatus to the network; and 11, an I/O bus (constituted by an address bus, data bus, and control bus) which connects the above units to each other.

Such a general-purpose computer apparatus is connected to the Internet 104 through a necessary network device (not shown) such as a modem or router, another computer apparatus, or the like, as needed.

In the photosite server 105 according to this embodiment, the image database 117 and information database 118 shown in FIG. 1 can be realized as predetermined areas in the HDD 8 in FIG. 2 (or independent HDDS). The respective software modules (the photo sharing module 106, a settlement module 107, and an accounting module 108) are stored in a predetermined area in the ROM 6 or HDD 8. Each function can be implemented by making the CPU 5 control necessary constituent elements on the basis of these modules.

(Print Order Processing)

Print order processing for the image data uploaded in the photosite server 105 in the network system shown in FIG. 1 will be sequentially described next.

The user of the user PC 102 can browse the image data, of the image data uploaded in the photosite server 105, which is uploaded by himself/herself through the Web browser. The methods of selecting images to be browsed include a method of selecting images to be sequentially browsed image by image, a method of registering a plurality of images as one album, selecting an album to be browsed from a plurality of albums, and selecting/browsing each image managed in the selected album, and the like.

In this embodiment, upon reception of a print order for uploaded image data from a user, the photosite server 105 requests one of the printsites 109A to 109C which provide printout services to do the corresponding processing. For the sake of illustrative convenience, only the three printsites described above are illustrated. However, the number of printsites is not specifically limited and may be less than three or four or more.

The user of the user PC 102 selects image data which the user wants to print out from an uploaded image browsing window. The user then selects a printsite to which he/she wants to give an order from the printsites 109A to 109C which the photosite server 105 can provide. The user can select a printsite in consideration of, for example, the services provided by each printsite, price, delivery time, and the like. For the sake of descriptive convenience, the following description will be made on the assumption that the user has selected the printsite 109A. Even if, however, the user selects the printsite 109B or 109C, the basic flow of information remains the same.

The photosite server 105 creates a temporary print order (estimation request) for the image data for which a printout request (temporary request) has been given, and transmits the order to the printsite 109A through the Internet 104. Upon reception of the temporary print order from the photosite server 105, the printsite 109A calculates an estimated price from the contents of the temporary print order by using a charge calculation module 110A, and notifies the photosite server 105 of the price through the Internet 104.

The photosite server 105 receives the information of this estimated price in real time and transfers it as Web information to the user PC 102. The photosite server 105 can therefore present, on the spot, the price presented by the printsite 109A to the user who has given the temporary print order. When the user of the user PC 102 who has given the temporary order approves of purchasing the service at this presented price and returns an approval action to the photosite server 105, the settlement module 107 receives this and performs settlement processing.

When the settlement is completed, the photosite server 105 sends a formal print order to the printsite 109A. The printsite 109A receives this formal print order and acquires the image data required for printing out from the image database 117 of the photosite server 105. The image data acquired in this manner is printed out as printed matter 112A by a printer 111A connected to the printsite 109A. The printed matter 112A is delivered, by mail or the like, to the address for delivery designated by the user of the user PC 102 who has given the printout request.

As examples of the photo services realized by the above system, the following services will be mainly described in this embodiment.

(1) User registration: Registration for the use of the photosite server 105 is done through the user PC 102. A user ID is issued.

(2) Image upload: The user PC 102 transfers image data to the photosite server 105.

Note that each of the above services will be described in detail later. Obviously, the services and functions realized by the photo service system according to this embodiment are not limited to those described above.

(Arrangement of Database)

FIGS. 3 to 9 are views showing examples of the data tables managed by the information database 118 of the photosite server 105 according to this embodiment. Note that in the respective data tables, common values are stored in items having the same names (e.g., in data tables associated with the same user, the same value is stored in the user ID items in the tables).

FIG. 3 is a view showing an example of the arrangement a data table associated with the customer information managed by the photosite server 105 in this embodiment. When the user executes user registration to be described later, one record of a user information data table 400 is created and registered in the database 118 to be managed. For a registered user, a unique user ID 401 is defined, and the user information data table 400 is managed by using this user ID 401 as a key.

The information managed as customer information includes a destination mail address 402, login name 403, password 404, name (last name) 405, name (first name) 406, phonetic transcriptions in kana (last name) 407, phonetic transcriptions in kana (first name) 408, zip codes (1, 2) 409 and 410, municipal division code 411, addresses (1, 2) 412 and 413, telephone numbers (1, 2, 3) 414, 415, and 416, and user registration state 417. When the user registration state 417 is 1, it indicates that the user has already been registered and is allowed to use the photosite server. When this information is 0, it indicates that the use of the server is inhibited.

FIG. 4 is a view showing an example of the arrangement of a customer state data table for managing information representing the current state of each user who uses the photosite server 105 in this embodiment. When the user executes user registration to be described later, one record of a user state data table 500 is created and registered in the database 118 to be managed. The value of each time in this record is updated whenever necessary in accordance with the operation performed by the user while using the photosite server 105. The data stored in this customer state data table 500 include, by using a user ID 501 as a key, an album ID 502 of the album that is currently displayed (or lastly displayed), a maximum disc capacity 503 that defines the maximum capacity in the image database 117 which can be used by the user, a point 504 that is accumulated when the user gives a print order, and a model ID 505 of the digital camera currently used by the user. As described above, the respective data tables for managing the same user have a common user ID. More specifically, the user ID 501 and user ID 401 in the customer information data table 400 and customer state data table 500 associated with the same user are equal in value.

FIG. 5 is a view showing an example of the arrangement of a customer album data table managed by the photosite server 105 in this embodiment. When the user creates one new album while using the photosite server 105, one record of a customer album data table 600 is created and registered in the database 118 to be managed. When the user deletes an album, the corresponding record is deleted from the information database 118. The data stored in the customer album data table 600 include, by using a user ID 601 of the registered user which serves as a key, an album ID 602 of the album created by the user, and a display ordinal number 603 of the album. Note that with respect to the same user, the value stored in the user ID 601 is equal to that in the user ID 401.

FIG. 6 is a view showing an example of the arrangement of an album information data table managed by the photosite server 105 in this embodiment. When the user creates a new album while using the photosite server 105, one record of an album information data table 700 is created and registered in the information database 118 to be managed. When the user deletes an album, the corresponding record is deleted from the information database 118.

The album information data table 700 manages an album name 702, a file path 703 to a comment on the album, a disclosure permission/inhibition flag 704 for the album, a password permission/inhibition flag 705, an album password 706, a print permission/inhibition flag 707, an original image display permission/inhibition flag 708, and a display form number 709 by using an album ID 701 as a key.

If the disclosure permission/inhibition flag 704 for the album is 1, it indicates that the album can be disclosed. If this flag is 0, it indicates the inhibition of disclosure. If the flag is −1, it indicates that the disclosure of the album is inhibited by the manager of the photosite server 105. If the password permission/inhibition flag 705 is 1, it indicates the presence of a password. If this flag is 0, it indicates the absence of a password. If the password permission/inhibition flag 705 is 1, the password is stored in the album password 706. If the print permission/inhibition flag 707 is 1, it indicates the album can be printed. If this flag is 0, it indicates that the album cannot be printed. If the original image display permission/inhibition flag 708 is 1, it indicates that display operation can be done. If this flag is 0, it indicates that display operation cannot be done. If the display form number 709 is 1, it indicates that the album is displayed in the form of a list. If this flag is 2, it indicates that the album is displayed in detail. Note that with respect to the same album, the value stored in the album ID 701 is equal to that in the album ID 602.

As will be described later, one each of record of the customer album data table 600 and album information data table 700 may be created in the process of user registration and registered in the information database 118.

FIG. 7 is a view showing an example of the arrangement of an album image data table managed by the photosite server 105 in this embodiment. Every time the user uploads one image onto an album, one record of an album image data table 800 is increased and registered in the information database 118 to be managed. When an image is deleted, the corresponding record is deleted from the information database 118. The data managed in the album image data table 800 include an image ID 802 of an image stored in an album having an album ID 801, and an image display number 803 indicating the display position of the image in the album. Note that with respect to the same album, the ID stored in the album ID 801 is equal to that in the album ID 701.

FIG. 8 is a view showing an example of the arrangement of an image information data table managed by the photosite server 105 in this embodiment. Every time the user uploads an image onto an album, one record of an image information data table 900 is created and registered in the information database 118 to be managed. When an image is deleted, the corresponding record is deleted from the information database 118. The image information data table 900 manages a user ID 902 of the user who owns the image, an image name 903, a file path 904 to the original image, a file path 905 to thumbnail image, a file path 906 to a display image, a file path 907 to a comment on the image, an image browse count 908, and an image print count 909 by using an image ID 901 as a key. With respect to the same image, the ID stored in the image ID 901 is equal to that in the image ID 802. With respect to the same user, the ID stored in the user ID 902 is equal to that in the user ID 401.

FIG. 9 is a view showing an example of the arrangement of a digital camera model information list 7900 managed by the photosite server 105 in this embodiment. In the digital camera model information list, the model ID of a digital camera, the model name, the number of pixels of the model, and the standard image size are registered. If the photosite server 105 in this embodiment is to be designed to receive only the image data photographed by specific digital cameras, only the specific models are registered in this list.

As shown in FIG. 9, in this embodiment, 500 kbytes (500000) which is the average image size of images photographed by 2,000,000-pixel digital cameras is registered as a standard image size in correspondence with model ID0 in order to cope with the images photographed by digital cameras which are not registered in the list and users who do not use digital cameras.

(Access Processing for Photosite Server 105)

Figure 10:
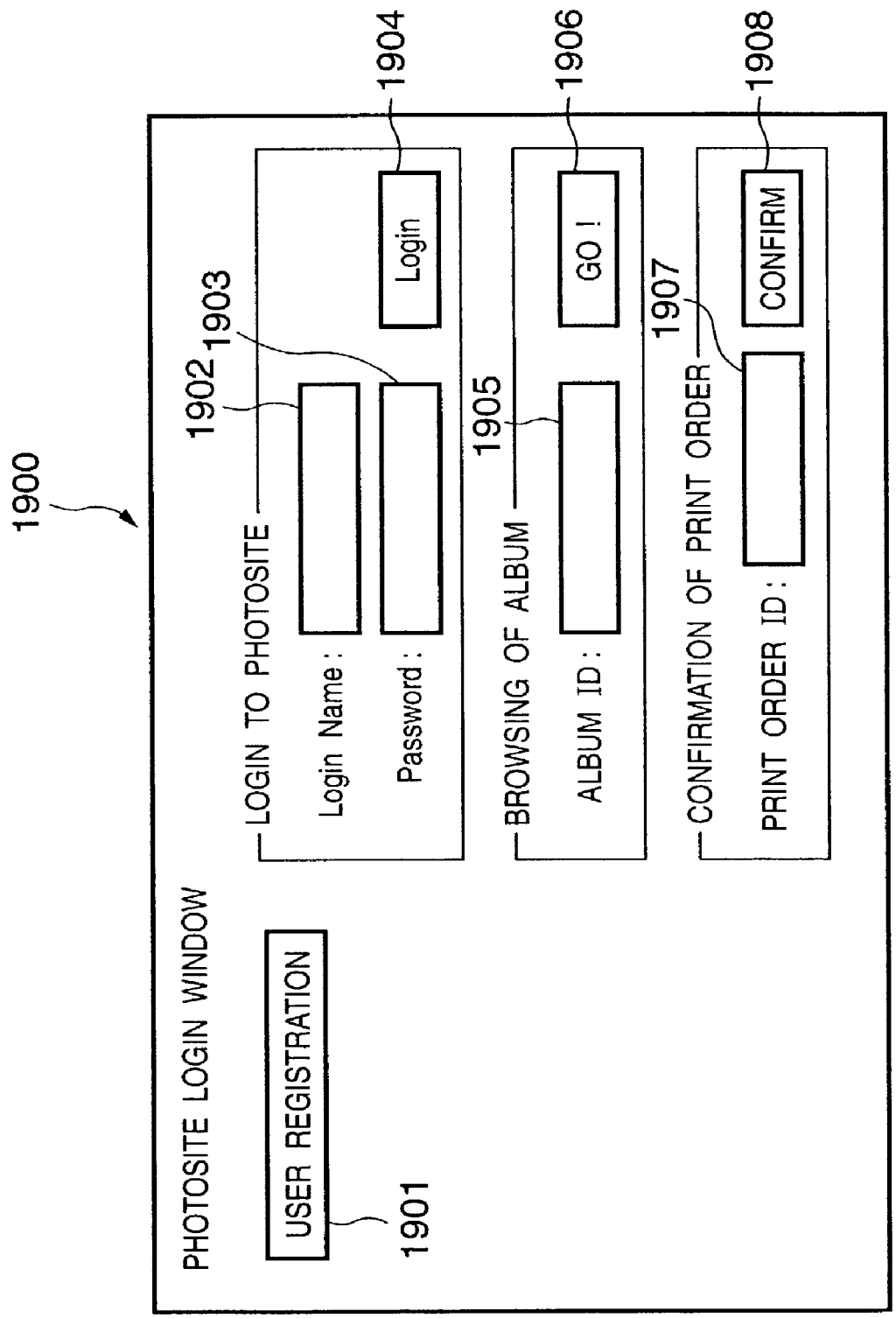
FIG. 10 is a view showing an example of the initial window transmitted from the photosite server according to the embodiment of the present invention.

FIG. 10 shows an example of the initial window displayed on the Web browser in the user PC 102 when a user accesses the photosite server 105 in this embodiment. The areas and buttons arranged on a window 1900 are a user registration button 1901, a login name input area 1902 which is used when the user having undergone user registration uses the photosite server 105, a password input area 1903, a login button 1904, an album ID input area 1905 for album browsing, an album browse button 1906, a print order ID input area 1907 for checking the status of a print order, and a print order confirmation button 1908.

The processing to be performed when each button on the window in FIG. 10 is pressed (clicked with a mouse or the like) will be described below.

(User Registration Processing)

User registration processing will be described first with reference to FIGS. 11 to 18.

Figure 11:
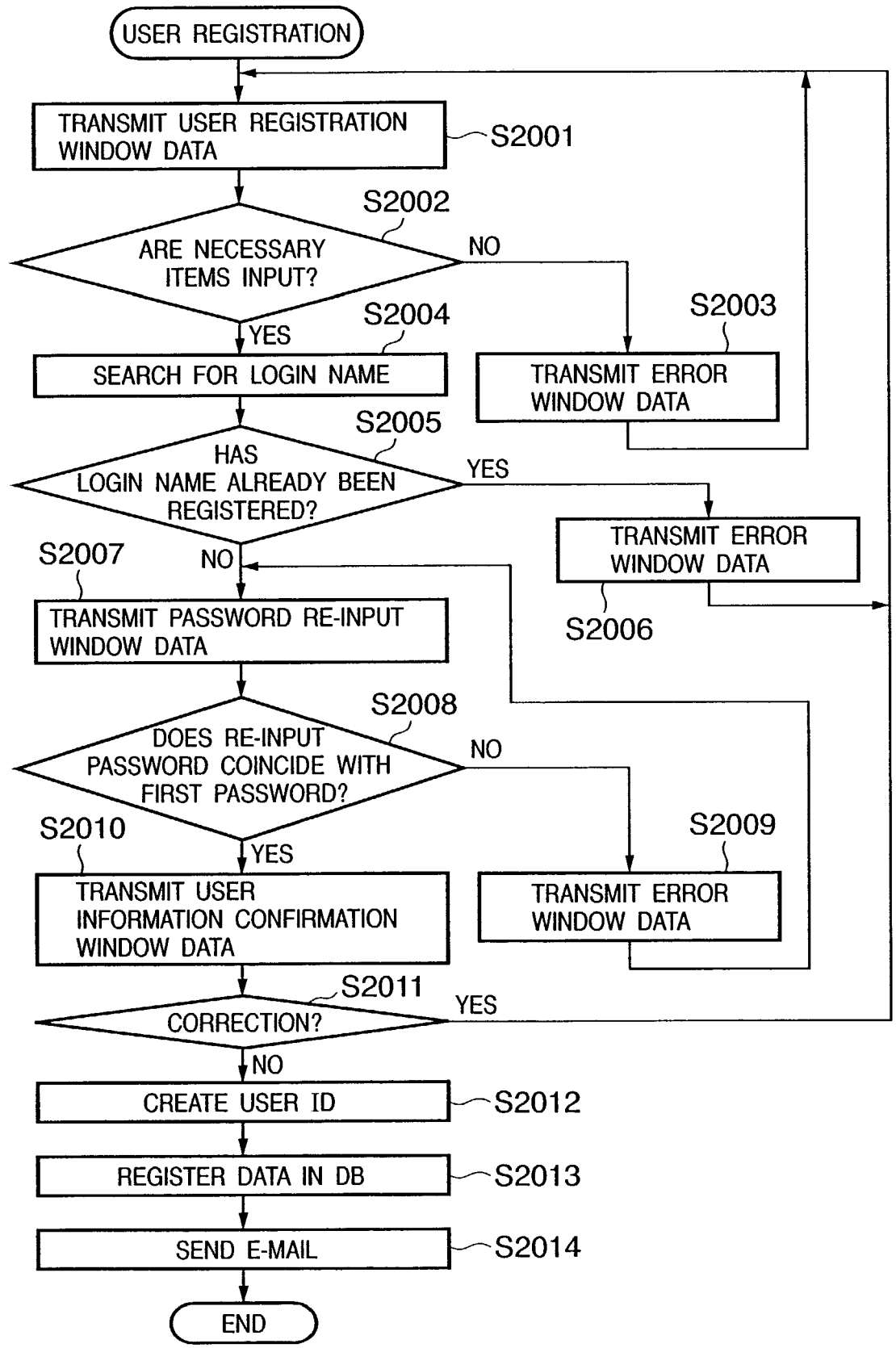
FIG. 11 is a flow chart for explaining user registration processing in the photosite server according to the embodiment of the present invention.

FIG. 11 is a flow chart showing processing in the photosite server 105 at the time of user registration. As described above, the processing shown in FIG. 11 is implemented by making the CPU 5 of a computer apparatus as a component of the photosite server 105 execute necessary software to control the constituent elements in the apparatus.

When the user registration button 1901 on the window 1900 in FIG. 10 is pressed, the photosite server 105 transmits, for example, the display data on the user registration window 2100 shown in FIG. 12 to the user PC 102, thereby starting user registration processing (step S2001).

A user registration window 2100 shown in FIG. 12 includes a notification destination e-mail address input area 2101 for a user to be registered, a login name input area 2102 for the user, a password input area 2103, name input areas 2104 and 2105, input areas 2106 and 2107 for the phonetic transcriptions of the name in kana, zip code input areas 2108 and 2109, a municipal division selection area 2110, address input areas 2111 and 2112, telephone number input areas 2113 to 2115, and an input area 2118 for inputting a digital camera model mainly used by the user. The input area 2118 has a pull-down list form, in which the model names that have registered in the digital camera model information list 7900 are registered in advance. An item corresponding to model name "none" is registered in the menu as an item "not using" to be selected by a user who does not use any digital camera. When only the registration of the users of models that are registered in advance in the digital camera model information list 7900 is to be accepted, item "not using" is eliminated, and only the models in the list are allowed to input. Although not shown in the flow chart of FIG. 11, when a cancel button 2117 is pressed, the user registration processing is terminated, and the window 1900 in FIG. 10 is displayed.

When the registration button 2116 on the user registration window 2100 is pressed, it is checked in step S2002 whether data concerning predetermined necessary items have been input. In this embodiment, if all data concerning the e-mail address input area 2101, login name input area 2102, password input area 2103, name input areas 2104 and 2105, telephone number input areas 2113 to 2115, and digital camera model name input area 2118 as necessary items have been input, it is determined that data concerning the necessary items have been input.

Figure 13:
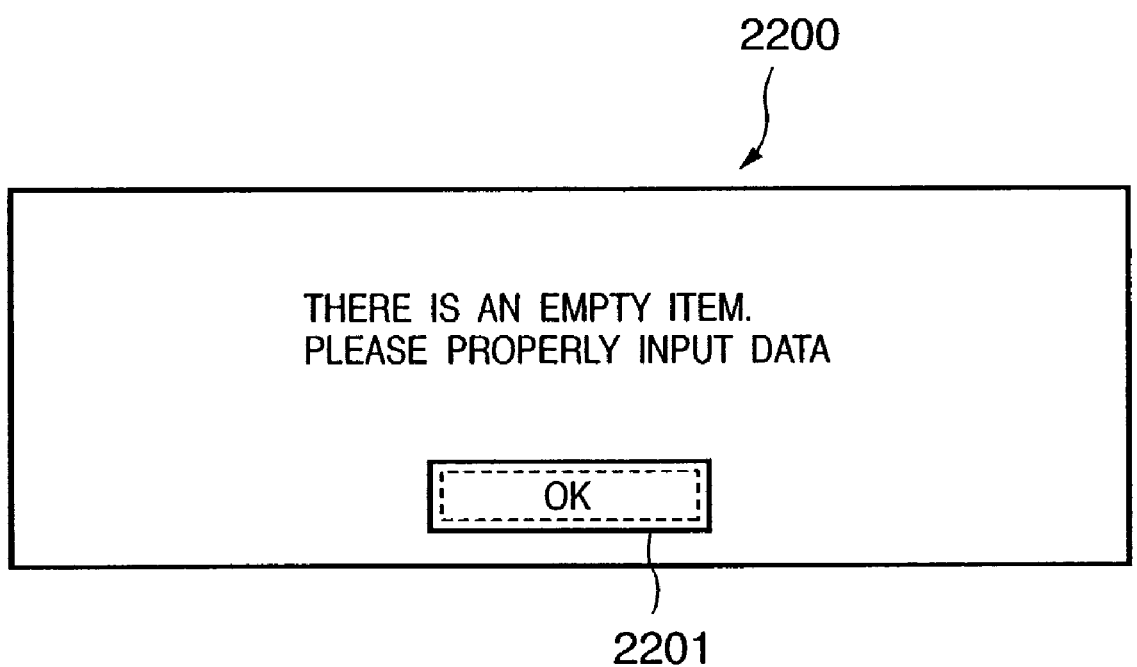
FIG. 13 is a view showing an example of the error window transmitted from the photosite server when data concerning a necessary item is not input in the user registration processing in FIG. 11.

If it is determined in step S2002 that data concerning the necessary times have not been input, error window data is transmitted in step S2003. FIG. 13 shows an example of an error window 2200 displayed on the basis of this error window data. When an OK button 2201 on the error window 2200 is pressed, the flow returns to step S2001 to transmit the display data of the user registration window 2100 again.

If it is determined in step S2002 that data concerning the necessary items have been input, the CPU 5 searches the user information data table 400 managed by the database 118 (step S2004) to check whether the login name input in the login name input area 2102 on the user registration window has already been used by another registered user (step S2005).

Figure 14:
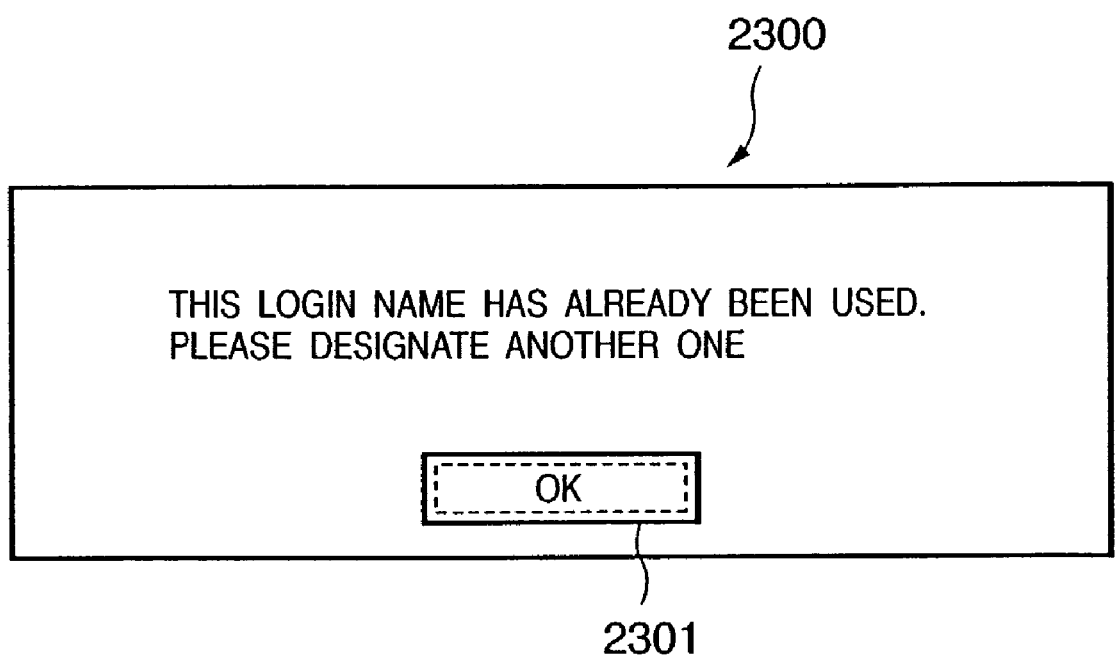
FIG. 14 is a view showing an example of the error window transmitted from the photosite server when the login name input by a user has already been registered in the user registration processing in FIG. 11.
Figure 15:
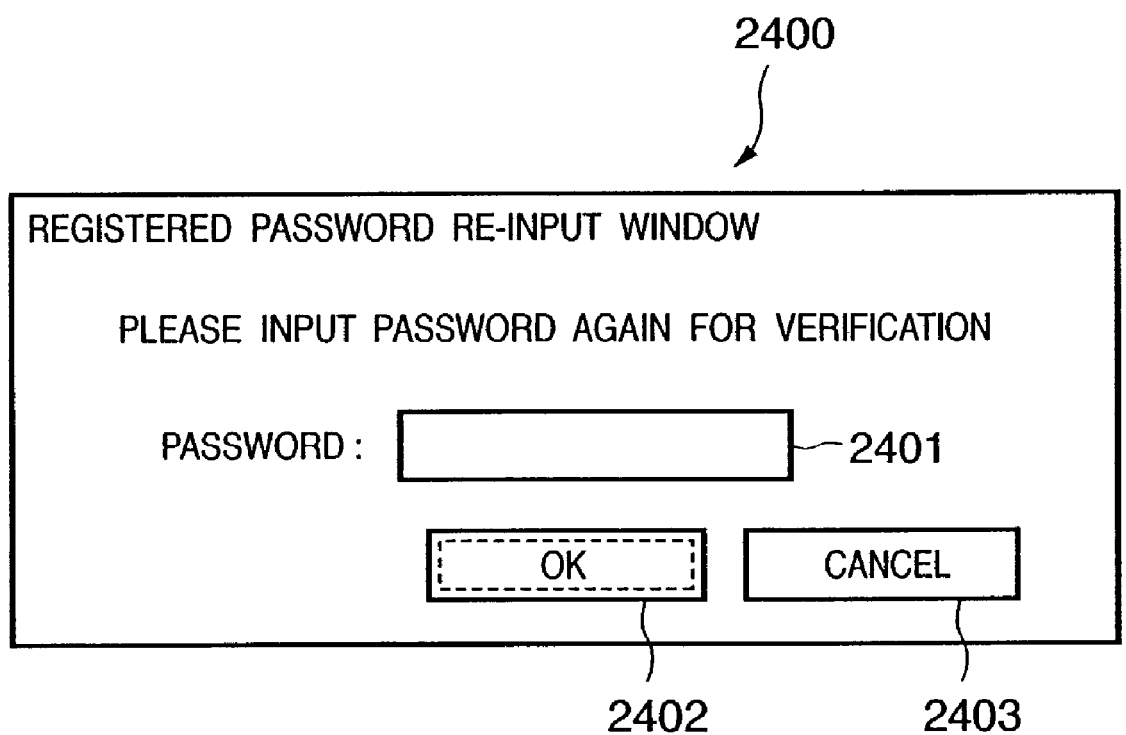
FIG. 15 is a view showing an example of the error window transmitted from the photosite server when the user is prompted to input a password again in the user registration processing in FIG. 11.

If the login name input in the login name input area 2102 has already been used, the data of an error window is transmitted in step S2006. FIG. 14 shows an example of an error window 2300 displayed on the basis of this error window data. If an OK button 2301 on the error window 2300 is pressed, the flow returns to step S2001 to transmit the display data of the user registration window 2100 again.

If the login name input in the login name input area 2102 is not found in the database 118, the data of a window for prompting the user to input a password again (e.g., a window 2400 shown in FIG. 15) (step S2007). If a cancel button 2403 on the password re-input window 2400 is pressed, the registration processing is interrupted, and the flow returns to step S2001 to transmit the display data of the user registration window 2100 again, although not shown in FIG. 11.

If an OK button 2402 on the password re-input window 2400 is pressed, it is checked whether the password input in a password input area 2401 on the window 2400 matches the password input in the password input area 2103 (step S2008).

Figure 16:
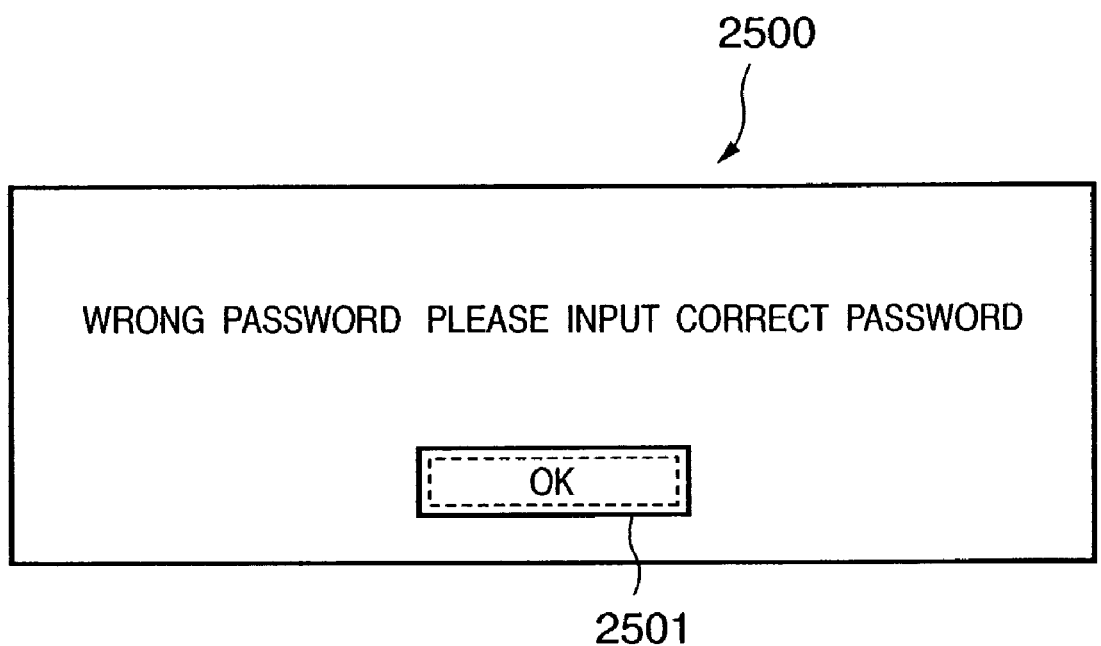
FIG. 16 is a view showing an example of the error window transmitted from the photosite server when the re-input password differs from a set password in the user registration processing in FIG. 11.

If it is determined that the re-input password differs from the initially set password, the data of an error window is transmitted in step S2009. FIG. 16 shows an example of an error window 2500 displayed on the basis of this error window data. If an OK button 2501 on the error window 2500 is pressed, the flow returns to step S2007 to transmit the display data of the password re-input window 2400 again.

If it is determined that the re-input password matches the initially set password, for example, the display data of a user information confirmation window 2600 in FIG. 17 is transmitted (step S2010). The information displayed on the user information confirmation window 2600 is the information input by the user on the user registration window 2100. If a correction button 2602 is pressed, the flow returns to step S2001 to transmit the display data of the user registration window 2100 (and the data that have already been input) (step S2011).

If a confirmation button 2601 on the user information confirmation window 2600 is pressed, the maximum value of the values of user IDs issued from the database 118 in the past is acquired. The value obtained by adding 1 to the acquired value is the user ID of the user (step S2012).

In step S2013, one record is added to the user information data table 400, and the user ID obtained in step S2012 is registered in the user ID 401, and the pieces of input information are registered in the other corresponding items on the user registration window 2100.

The input areas on the user registration window 2100 correspond to the items in the user information data table 400 in such a manner that the pieces of information input in the input areas 2101 to 2115 on the user registration window 2100 are sequentially stored in the items 402 to 416 in the user information data table. In addition, 1 is stored in the user registration state 417.

As described above, a new record is also added to the customer state data table 500. The user ID obtained in step S2012 is stored in the user ID 501; 0, in the last display album ID; a numerical value (e.g., the number of bytes) representing the maximum storage capacity, in the maximum disc capacity 503; and 0, in the cumulative point 504. If the CPU searches the digital camera model information list 7900 for the input contents of the input area 2118 and finds the corresponding model ID, the CPU registers the model ID in the model ID 505 of the digital camera mainly used by the user. If the user uses no digital camera, 0 is set in the model ID.

When a user is newly registered, there are no album created by the user or uploaded image. When a user is newly registered, therefore, one each of record of the customer album data table 600 and album information data table 700 may be created and registered in the information database 118 in advance. In this case, the value obtained by adding one to the maximum value of the album IDs that have been issued so far by the information database 118 is set in the album ID 602; 1, in the display ordinal number 603; and the temporary album name ("my album" in this embodiment) created by the system, in the album name 702. In the remaining album information data tables, the initial values determined by the photosite server 105 are respectively set.

When registration of necessary records in the information database 118 is completed in step S2013, e-mail having the same contents as those displayed on the user information confirmation window 2600 is created and transmitted to the address registered in the destination e-mail address 402 in the customer information data table 400 (step S2014). FIG. 18 shows an example of the e-mail transmitted in step S2014.

Note that in the user registration processing in FIG. 12, the registration of only the users of the models registered in the digital camera model information list 7900 may be accepted. In this case, the CPU may search the digital camera model information list 7900 for the input contents of the input area 2118 when checking input operation for necessary times in step S2002. If no corresponding model is found, the display data of an error message (e.g., "user registration is limited to only users of our products") may be transmitted, and the registration processing may be stopped.

(Photosite Service Processing—User Authentication)

Processing for various services provided from the photosite server 105 to a given registered user will be described next with reference to FIGS. 10 and 19 to 32.

Figure 19:
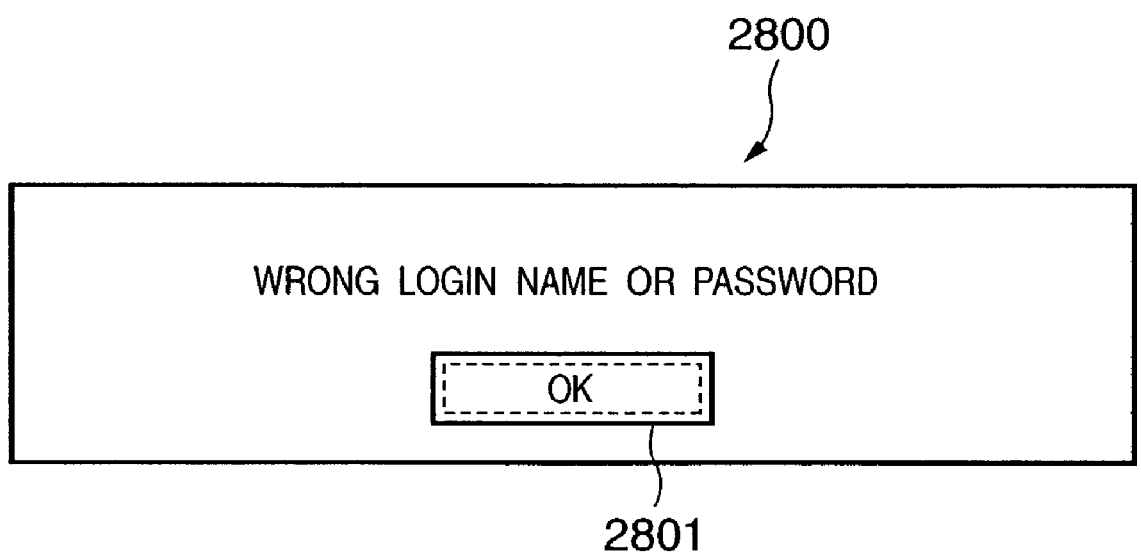
FIG. 19 is a view showing an example of the error window transmitted from the photosite server when the user fails to log in from the initial window in FIG. 10.

When the user inputs a login name and password in the login name input area 1902 and password input area 1903, respectively, and presses the login button 1904 on the login window 1900 in FIG. 10, the photosite server 105 searches the customer information data table 400 in the database 118 for a corresponding login name, and compares it with the password. Assume that no corresponding login name is found in the customer information data table 400 or that a corresponding login name is found, but the password registered in the customer information data table 400 differs from the password input in the password input area 1903 on the login window 1900. In this case, for example, the display data of a warning window 2800 shown in FIG. 19 is transmitted. If a button 2801 on the warning window 2800 is pressed, the display data of the login window 1900 is transmitted again.

As described above, assume that in this embodiment, all the images uploaded by users are managed on a folder (called an album) basis.

If a record containing both the login name and the password input on the login window 1900 is found n the customer information data table 400, it is determined that the registered user has done proper login, and the data of a service provision initial screen corresponding to the registered user is created from information such as the user ID and album ID and transmitted.

Figure 20:
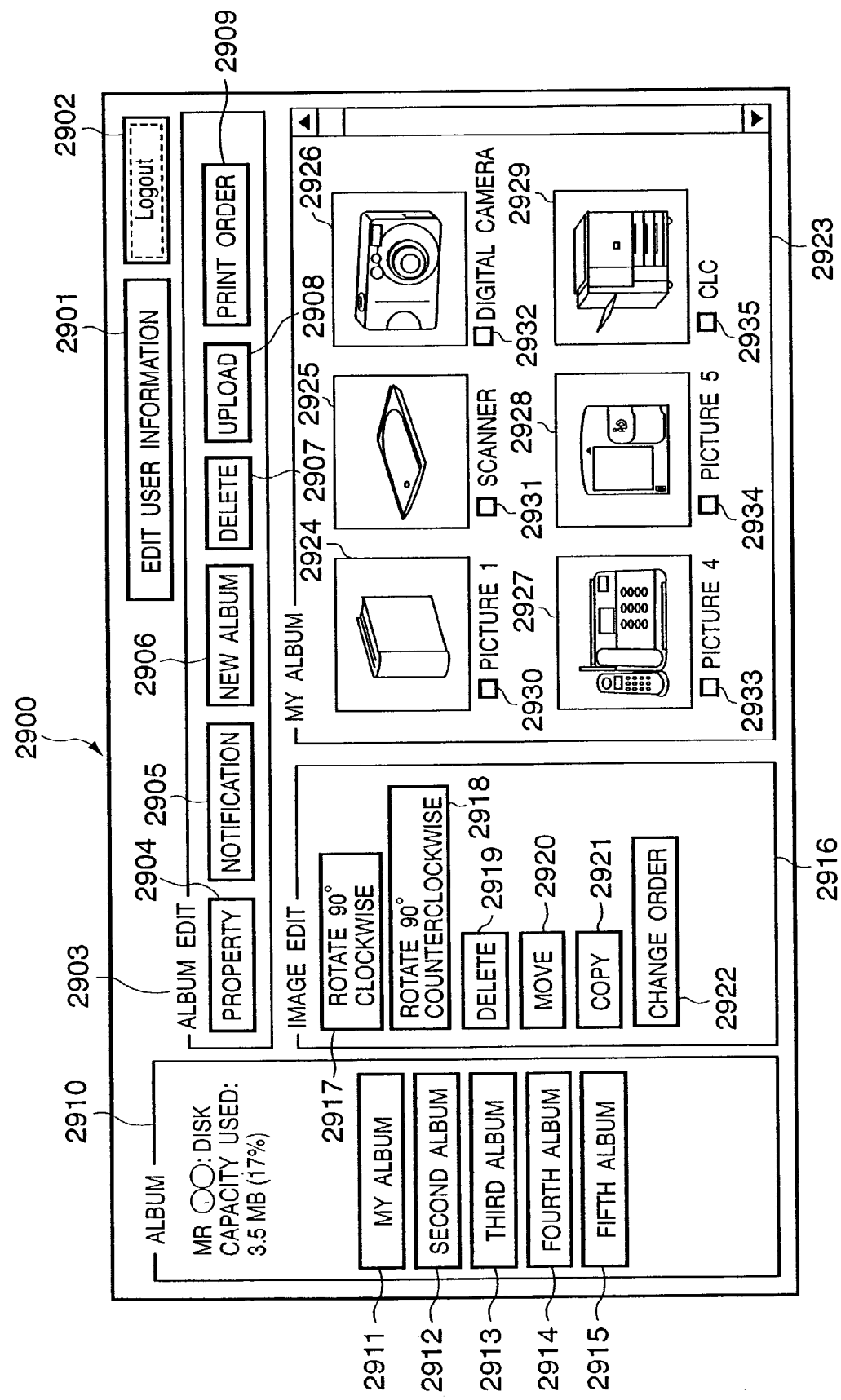
FIG. 20 is a view showing an example of the service provision initial window transmitted to a user PC when the user successfully logs in to the photosite server according to the embodiment of the present invention.

FIG. 20 shows an example of a service provision initial window 2900. On the window 2900, a button 2901 is a button for editing user information. A button 2902 is a logout button. Buttons for edit operation for the album displayed on this window are arranged in an area 2903. A button 2904 is a button for setting the properties of an album. A button 2905 is an album notification button. A button 2906 is a button for newly creating an album. A button 2907 is a button for deleting an album. A button 2908 is a button for uploading image data. A button 2909 is a print order button.

An area 2910 is an area in which buttons for album selection are displayed. On the upper portion of this area, the total data size of images data stored (uploaded) in the photosite server 105 is displayed, together with its ratio to the allowable capacity. Buttons equal in number to the albums created by the user are arranged below the upper portion. Referring to FIG. 20, buttons 2911 to 2915 indicate that five albums were created by the user. When a given one of the buttons 2911 to 2915 is pressed, the photosite server 105 displays the images uploaded in the album corresponding to the pressed button in an album display area 2923, and displays, on the upper left end of the album display area, the album name of the album whose images are being displayed (i.e., referring to FIG. 20, the images of "my album" are displayed in the album display area 2923). For images 2924 to 2929 displayed in the album display area 2923, corresponding check boxes 2930 to 2935 are arranged. When a displayed image itself is pressed, a property setting window for the image is displayed.

An area 2916 is an area in which buttons associated with edit processing for the respective images in an album are arranged. When a given one of buttons 2917 to 2922 is pressed, edit processing corresponding to the pressed button is performed for one of the images displayed in the album display area 2923 which corresponds the check box that is checked.

(Photosite Service Processing—Outline of Processing after Login)

Figure 21:
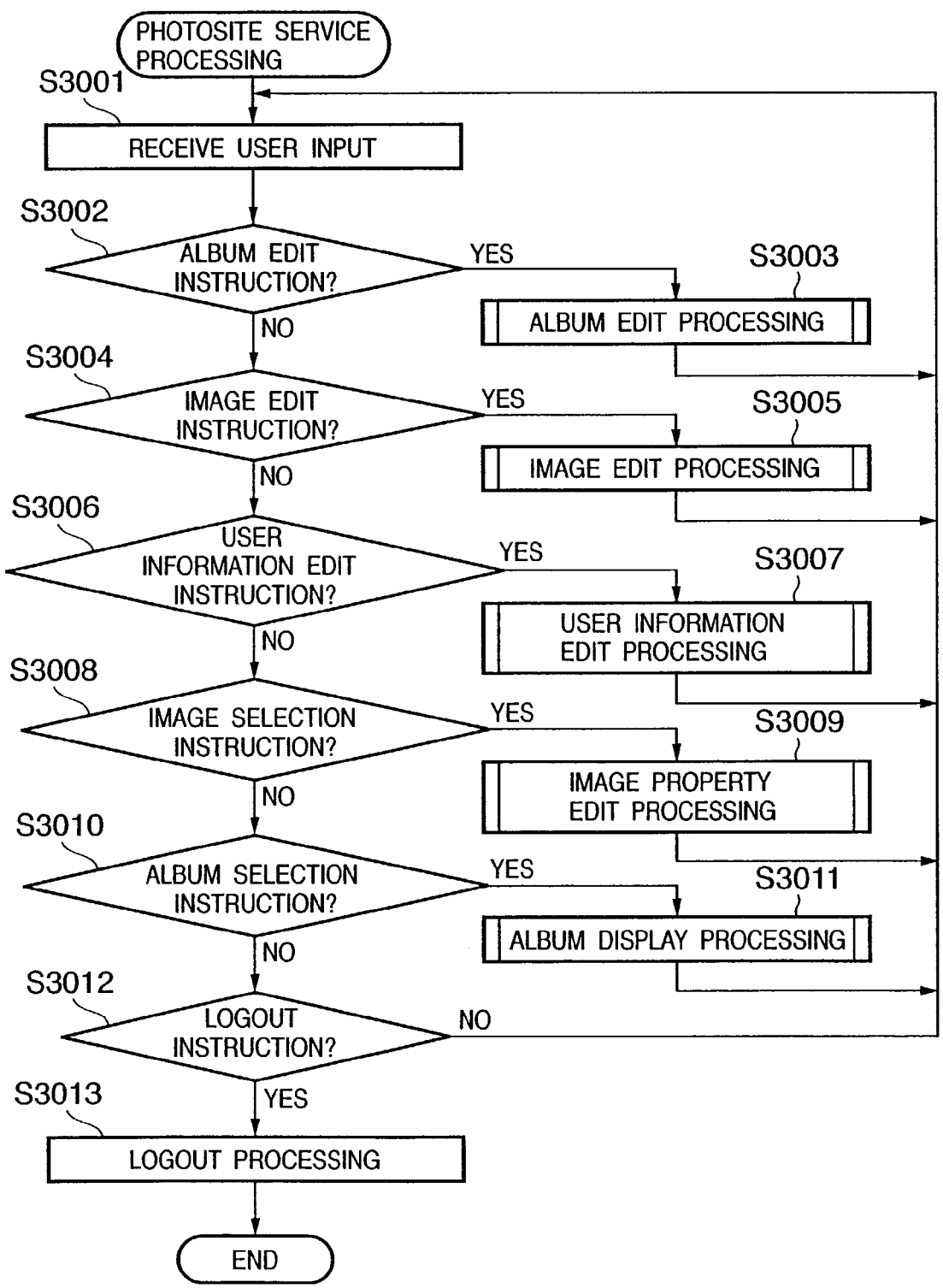
FIG. 21 is a flow chart for explaining an outline of photosite server processing with respect to user operation on the service provision initial window shown in FIG. 20.

FIG. 21 is a flow chart showing an outline of the processing to be performed by the photosite server 105 in accordance with user's operation on the service provision initial window 2900 shown in FIG. 20 after the login processing by the registered user.

First of all, in step S3001, the CPU waits for some input from the user (operation on the service provision initial window 2900). If input operation is done, it is checked in step S3002 whether the user input is an instruction to perform album edit processing, i.e., one of the buttons 2904 to 2909 included in the album edit area 2903 is pressed. If one of the buttons in the area 2903 is pressed, the flow advances to the album edit processing in step S3003.

If it is determined in step S3002 that the user input is not an instruction to perform album edit processing, it is checked in step S3004 whether the input is an instruction to perform image edit processing. When one of the buttons 2917 to 2922 in the area 2916 on the service provision initial window 2900 is pressed, it is determined that the input is an instruction to perform image edit processing, the flow then advances to the image edit processing in step S3005.

If it is determined in step S3004 that the user input is not an instruction to perform image edit processing, it is checked in step S3006 whether the input is an instruction to perform edit processing for user information. That is, it is checked whether the button 2901 on the service provision initial window 2900 is pressed. If it is determined that the button 2901 is pressed, the data on the user registration window 2100 shown in FIG. 12 and the user information that has already been registered are transmitted in step S3007. The user can change the registered information by changing the contents of a desired item on the user registration window 2100 and pressing the registration button 2116.

If it is determined in step S3006 that the user input is not an instruction to perform edit processing for user information, it is checked in step S3008 whether the input is an image selection instruction, i.e., one of the images displayed in the album display area 2923 is pressed. If it is determined that an image is selected, the flow advances to the image property edit processing in step S3009.

If it is determined in step S3008 that the user input is not an image selection instruction, it is checked in step S3010 whether the user input is an album selection instruction, i.e., one of the buttons 2911 to 2915 in the area 2910 on the service provision initial window 2900 is pressed. If it is determined that one of these buttons is pressed, it is determined that album selection is performed, and the album display processing in step S3011 is performed. The album display processing will be described later.

If it is determined in step S3010 that the user input is not an album selection instruction, it is checked in step S3012 whether the user input an logout instruction. If the button 2902 on the service provision initial window 2900 is pressed, it is determined that the user input is a logout instruction, and the flow advances to step S3013.

If it is determined in step S3012 that the user input is not a logout instruction, the flow returns to step S3001 to wait for the next user input.

In step S3013, logout processing is performed. When logout processing is performed, the photosite server 105 updates the data of the last display album ID 502 of the customer state data table 500 in the memory 118 by registering the currently displayed album ID. Thereafter, the photosite server 105 transmits the display data of the initial window 1900.

Step S3003 (album edit processing) and step S3011 (album selection/display processing) in FIG. 21 will be described in detail below. However, a detailed description of step S3005 (image edit processing) and step S3009 (image property edit processing) which are not directly relevant to the present invention will be omitted. In addition, step S3007 (user information edit processing) is also the same as that described in the description of user registration processing, and hence a detailed description thereof will be omitted. Note, however, that the user information edit processing differs from that at the time of user registration in that the information registered by the user is displayed as initial values when a window is displayed, the service provision initial window 2900 is displayed when the cancel button 2117 is pressed, and registration of user information in the information database 118 amounts to the updating of existing user information instead of the registration of new information.

(Photosite Service Processing—Album Edit Processing)

Figure 22:
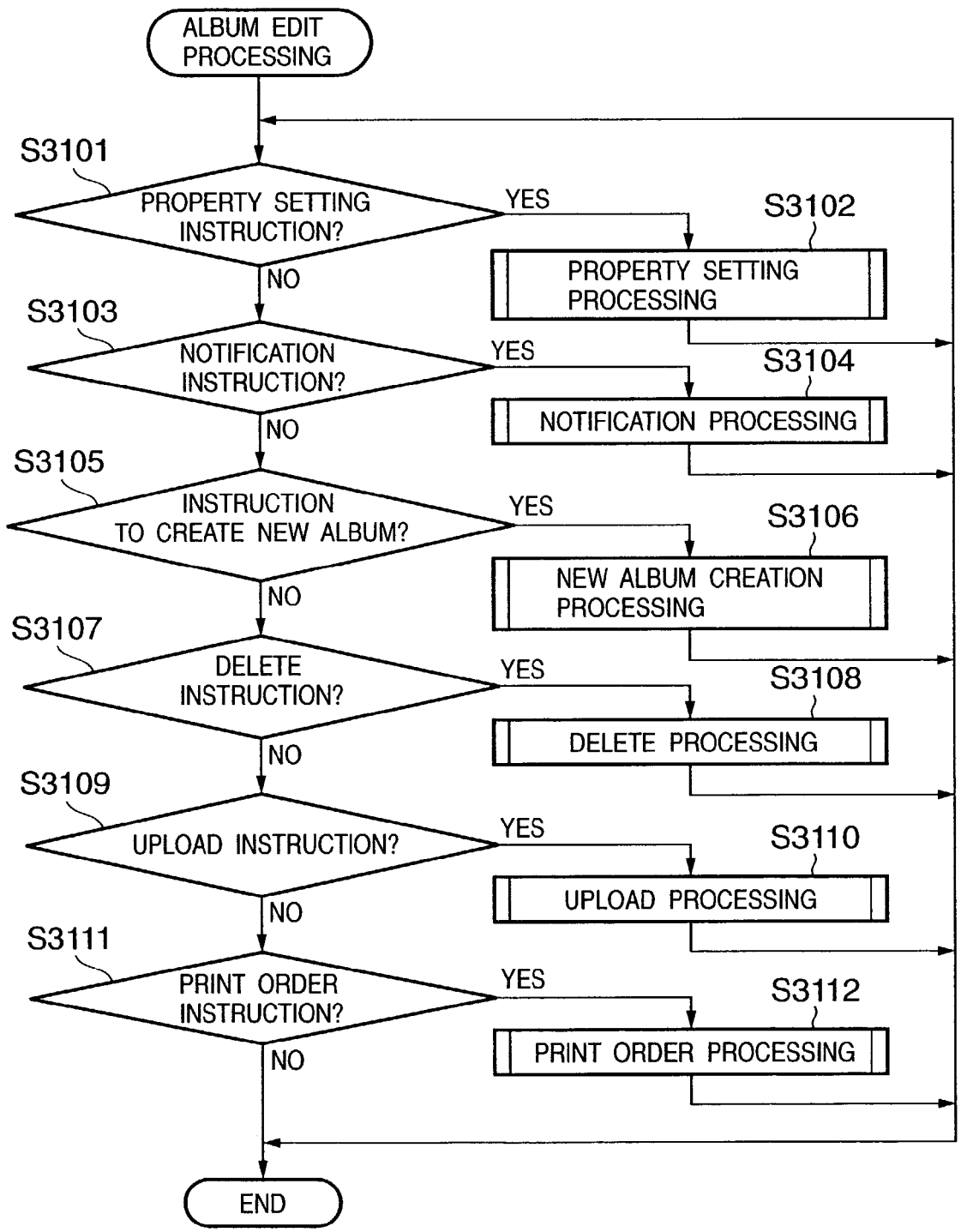
FIG. 22 is a flow chart for explaining photosite server processing with respect to user operation for an album edit area on the service provision initial window shown in FIG. 20.
Figure 23:
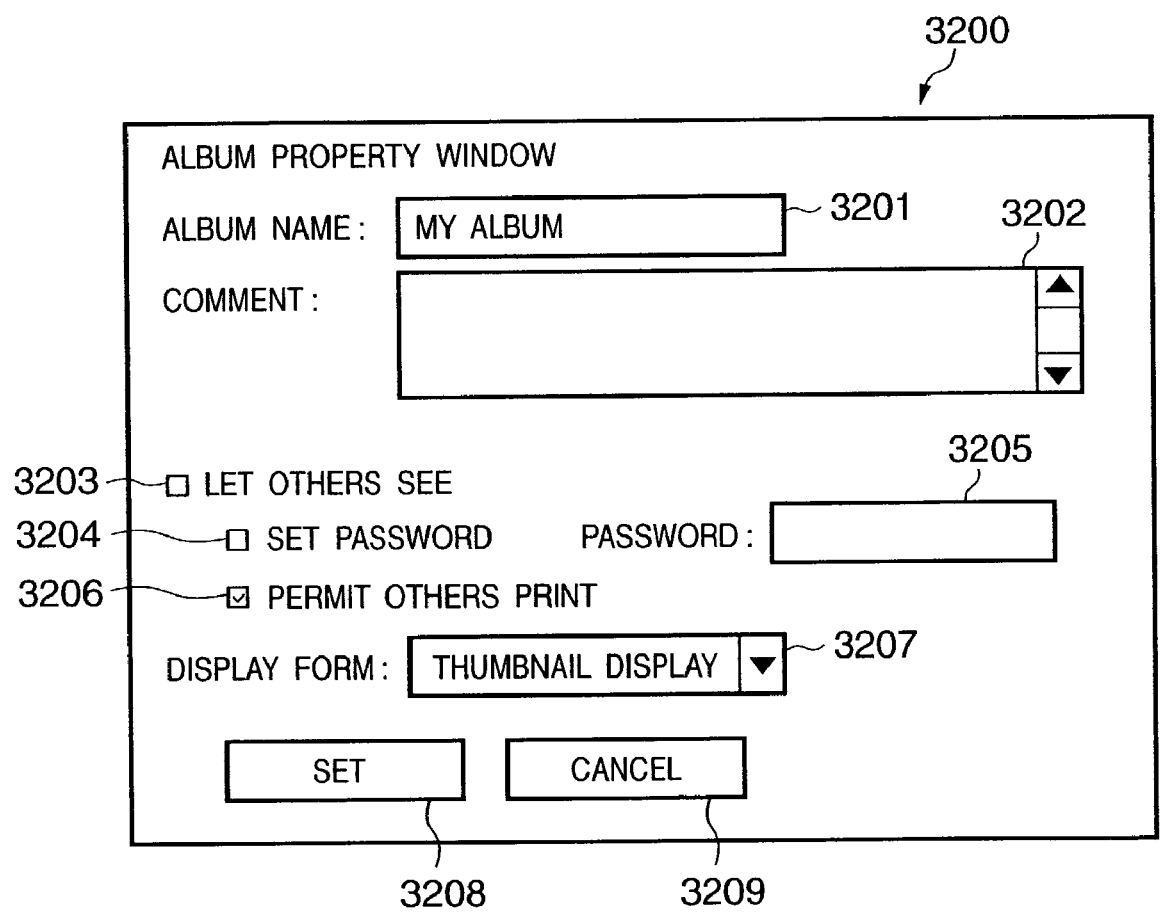
FIG. 23 is a view showing an example of the window transmitted from the photosite server when album property setting processing is performed in the album edit processing in FIG. 22.
Figure 24:
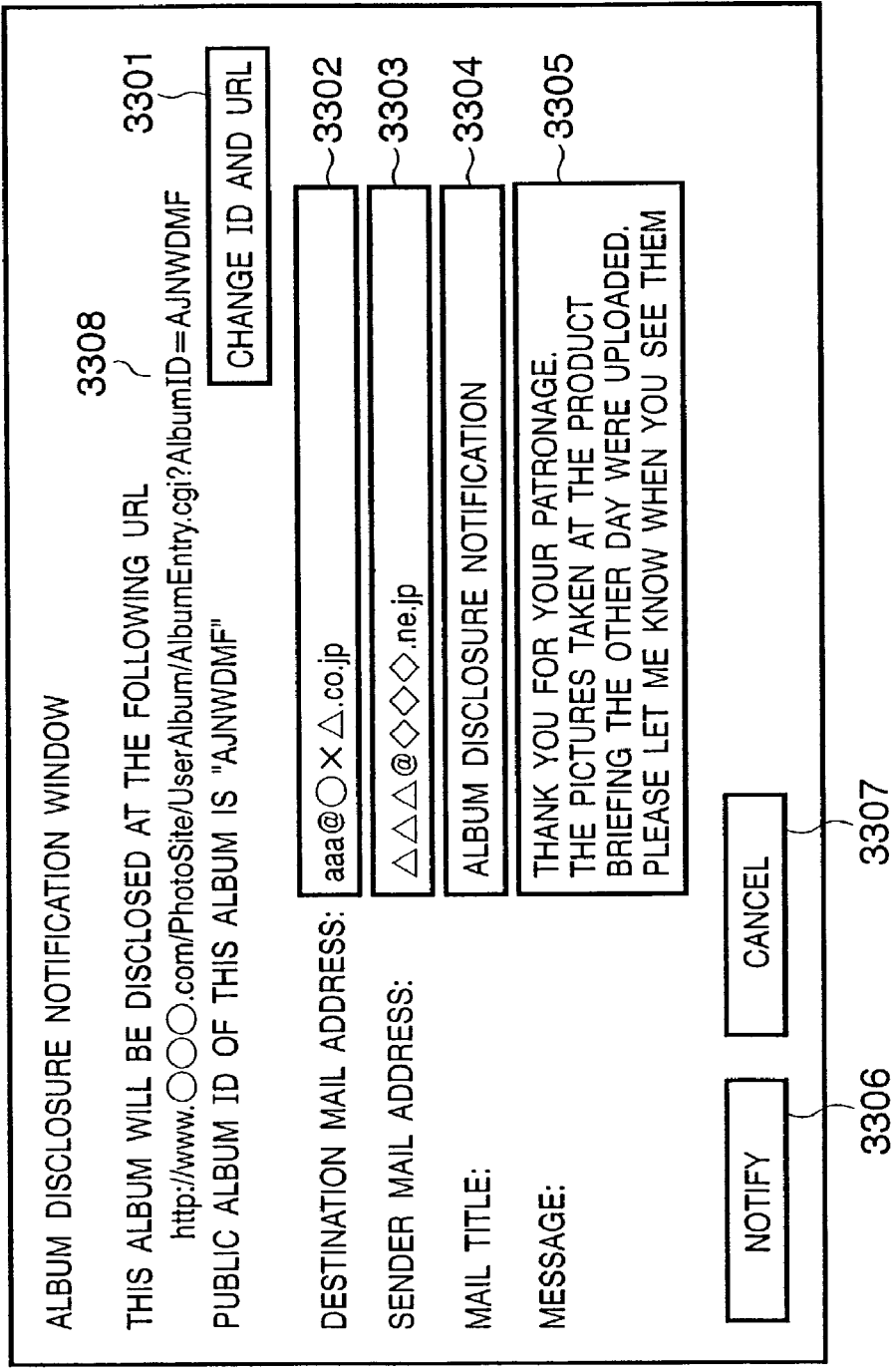
FIG. 24 is a view showing an example of the window transmitted from the photosite server when album disclosure notification processing is performed in the album edit processing in FIG. 22.
Figure 25:
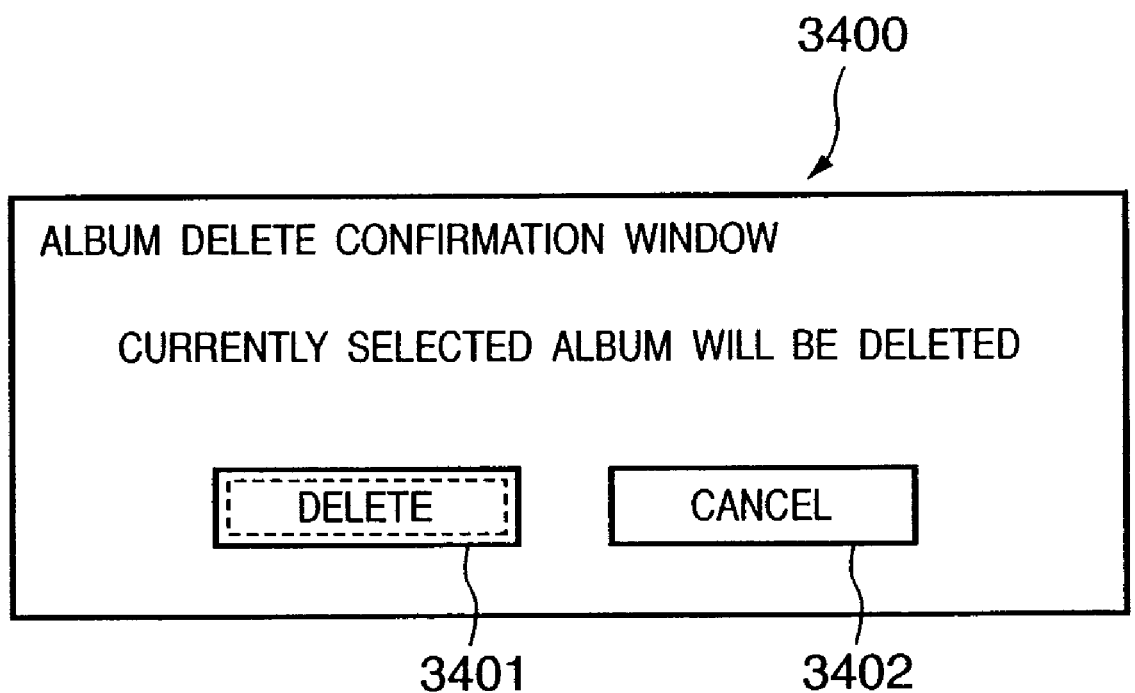
FIG. 25 is a view showing an example of the window transmitted from the photosite server when album delete processing is performed in the album edit processing in FIG. 22.

FIG. 22 is a flow chart showing a procedure for album edit processing performed by the photosite server 105.

First of all, it is checked in step S3101 whether property setting is designated, i.e., the button 2904 is pressed. If the button 2904 is pressed, the flow advances to step S3102 to transmit, for example, the data of a property edit window 3200 in FIG. 23. The user can set various attributes associated with the currently displayed/edited album by using the property edit window 3200, and a detailed description thereof will be omitted.

If it is determined in step S3101 that the input is not a property setting instruction, it is checked in step S3103 whether the input is an album notification instruction, i.e., the button 2905 is pressed. If the button 2905 is pressed, the flow advances to step S3104 to transmit, for example, the display data of an album notification window 3300 shown in FIG. 24. The user can make settings by using the album notification window 3300 to notify the desired third party of a method of browsing the currently displayed/edited album by e-mail. A detailed description of this processing will be omitted.

If it is determined in step S3103 that the input is not an album notification instruction, it is checked in step S3105 whether the input is an instruction to newly create an album, i.e., the button 2906 is pressed. If the button 2906 is pressed, the flow advances to step S3106 to transmit the data of the property edit window 3200 shown in FIG. 23. The user can setting the properties of an album to be newly created by using the property edit window 3200. After the properties are set, a new album is created. A detailed description of this processing will be omitted.

If it is determined in step S3105 that the input is not an instruction to newly create an album, it is checked in step S3107 whether an album delete instruction, i.e., the button 2907 is pressed. If the button 2907 is pressed, the flow advances to step S3108 to transmit, for example, the data of an album delete window 3400 shown in FIG. 25. The user can delete the currently displayed/edited album by pressing the delete button 3401 on the album delete window 3400. A detailed description of album delete processing will be omitted.

If it is determined in step S3107 that the input is not an album delete instruction, it is checked instep S3109 whether the input is an instruction to upload image data on to the currently displayed/edited album, i.e., the button 2908 is pressed. If the button 2908 is pressed, the flow advances to step S3110 to perform upload processing. This processing will be described in detail later.

If it is determined in step S3109 that the input is not an instruction to upload image data onto the album, it is checked in step S3111 whether the input is an album print order, i.e., the button 2909 is pressed. If the button 2909 is pressed, the flow advances to step S3112 to perform the above print order processing. A detailed description of this processing will be omitted.

(Photosite Service Processing—Album Selection/Display processing)

Figure 26:
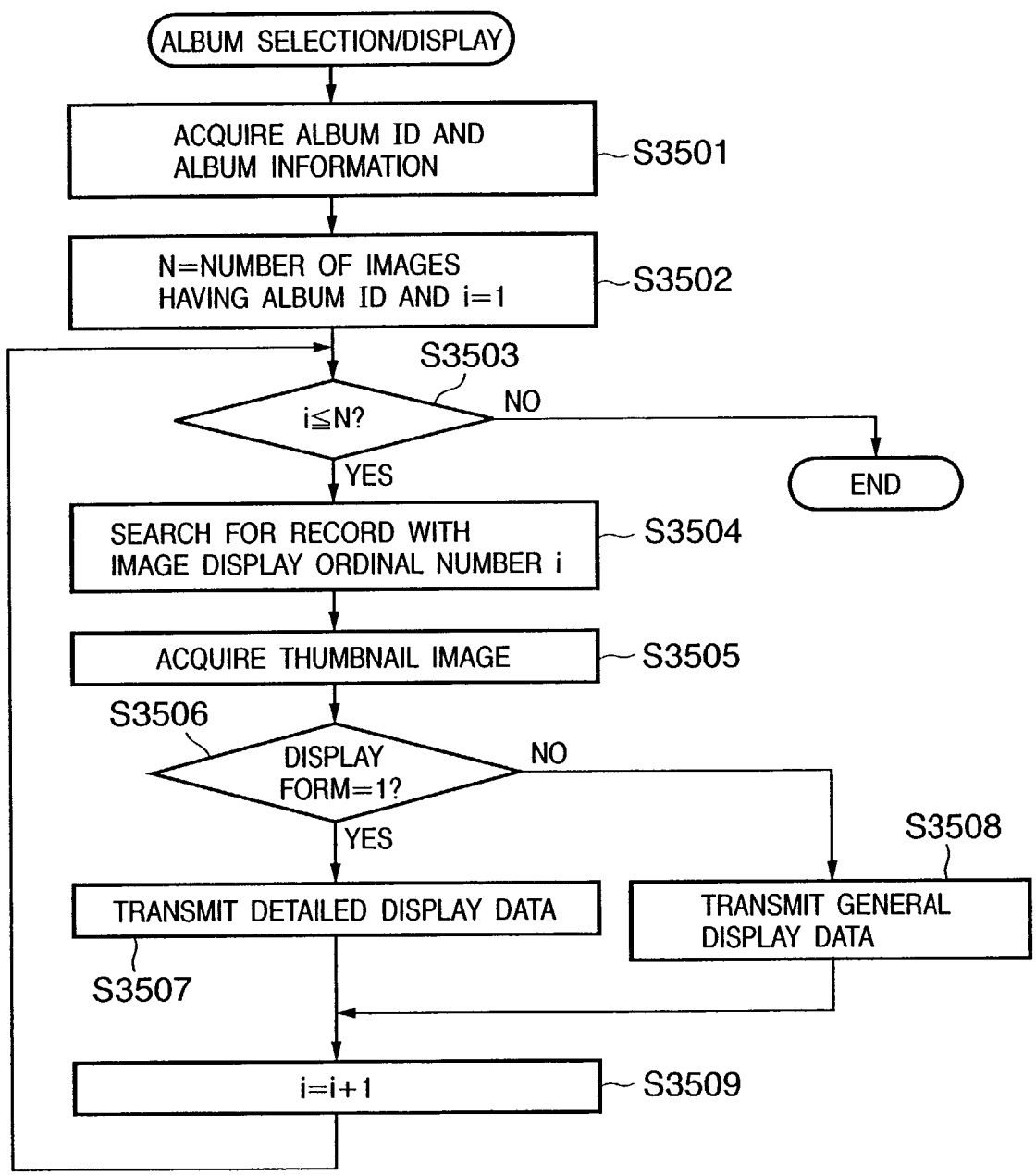
FIG. 26 is a flow chart for explaining the processing (album selection and display processing) to be done by the photosite server with respect to user operation of an album selection button on the service provision initial window shown in FIG. 20.

The processing in step S3011 in FIG. 21, i.e., the album selection/display processing to be performed by the photosite server 105 when one of the album selection buttons 2911 to 2915 in the album selection area 2901 in the service provision initial window 2900 is pressed, will be described next with reference to the flow chart of FIG. 26.

It is checked in step S3501 which ordinal number the pressed button has with respect to the head of the group of buttons, i.e., which album display ordinal number corresponds to the pressed button, and the customer album data table 600 in the information database 118 is searched by using the user ID of the login user and the obtained album display ordinal number as keys. The corresponding record is obtained from the hits, i.e., the found records, by searching the album information data table 700 in the information database 118 using the album ID as a key.

The album image data table 800 in the information database 118 is searched by using the album ID acquired in step S3501 to search out all the records having this album ID in the album ID 801. The number of corresponding records is represented by N, and 1 is assigned to a process variable i for image counting (step S3502).

It is checked in step S3503 whether i≦N. The processing from step S3504 to step S3509 is repeated while i≦N, thus displaying the images within the album.

The data table acquired in the step S3502 is then searched to find a record having the same value as i in the image display number 803, and the image ID of the corresponding image is obtained. The image information data table 900 in the information database 118 is searched to find a record having the obtained image ID in the image ID 901 (step S3504).

A thumbnail image is then acquired from the image database 117 by using the thumbnail file path 905 of the corresponding record (step S3505).

It is checked in step S3506 whether the value of the display form number 709 in the album information data table 700 acquired in step S3501 is 1. As described above, in this embodiment, if this value is 0, it indicates thumbnail display. If the value is 1, it indicates detailed display.

Figure 27:
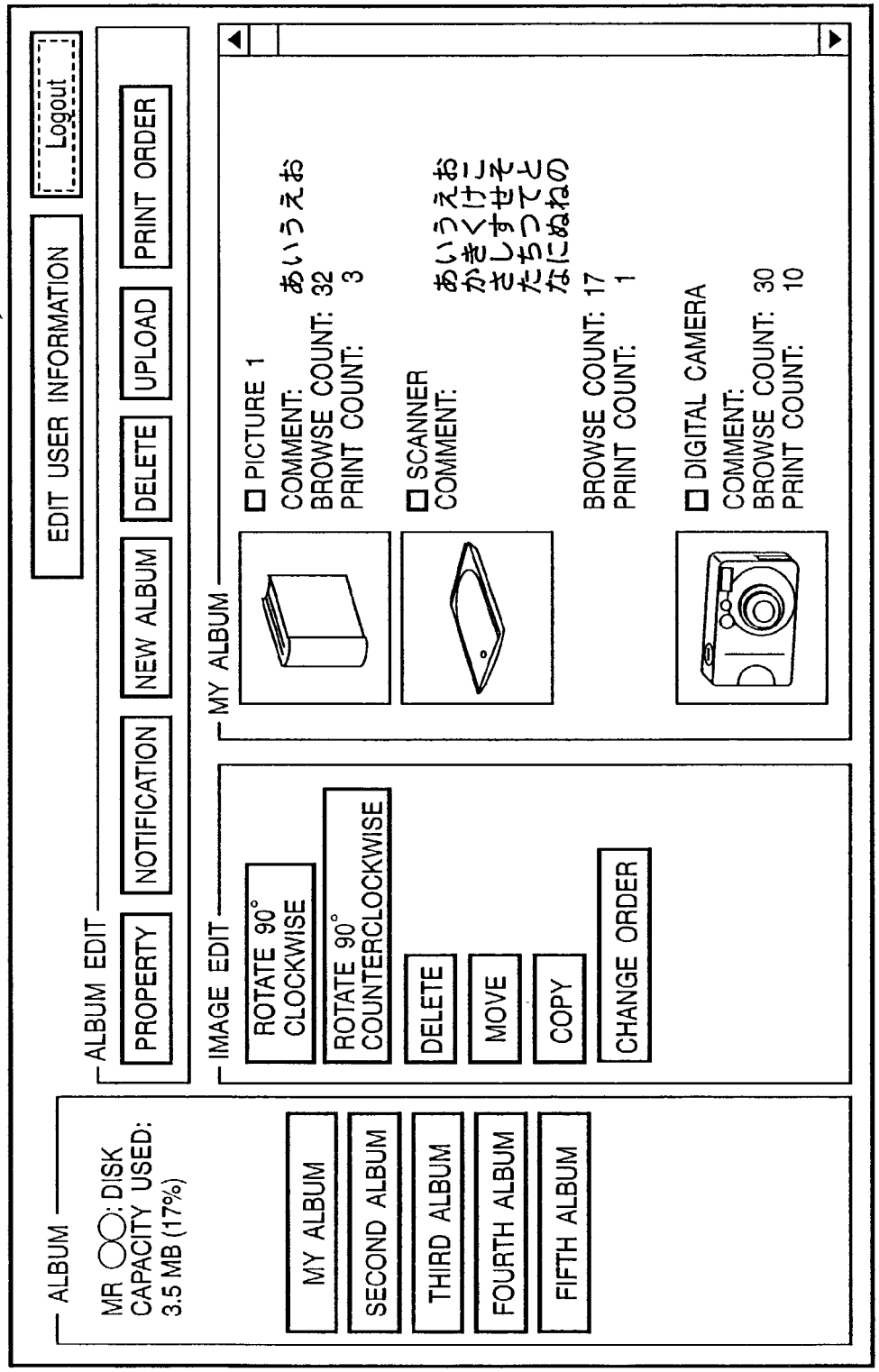
FIG. 27 is a view showing an example of the detailed display window transmitted from the photosite server in the album selection/display processing in FIG. 26.

If the value of the display form number 709 is 1, detailed display data is transmitted in step S3507. The detailed display data contains a thumbnail image, detailed information about the image, and image edit check boxes corresponding to the thumbnail image. In this embodiment, as the detailed information to be transmitted when detailed display is designated, the image name 903 from the image information data table 900, the comment acquired by using the comment file path 907, the image browse count 908, and the image print count 909 are used. FIG. 27 shows an example of an album display window 3600 when detailed display is performed. Since this window 3600 is the same as the service provision initial window 2900 except for the display method of the album display area 2923, a detailed description thereof will be omitted.

If it is determined in step S3506 that the display form number 709 is not 1, general thumbnail image display data for displaying thumbnail images, image names, and image edit check boxes is transmitted in step S3508. The service provision initial window 2900 in FIG. 20 is an example of the general thumbnail display window.

When the display data transmission in step S3507 or S3508 is completed, the variable i is incremented by one, and the flow returns to step S3503. If it is determined that i>N, since all the images in the album are displayed, the processing is terminated.

In this case, only the two display forms, i.e., detailed display and general display, are described. Obviously, however, three or more display forms maybe used.

(Photosite Service Processing—Image Upload Processing)

Figure 28:
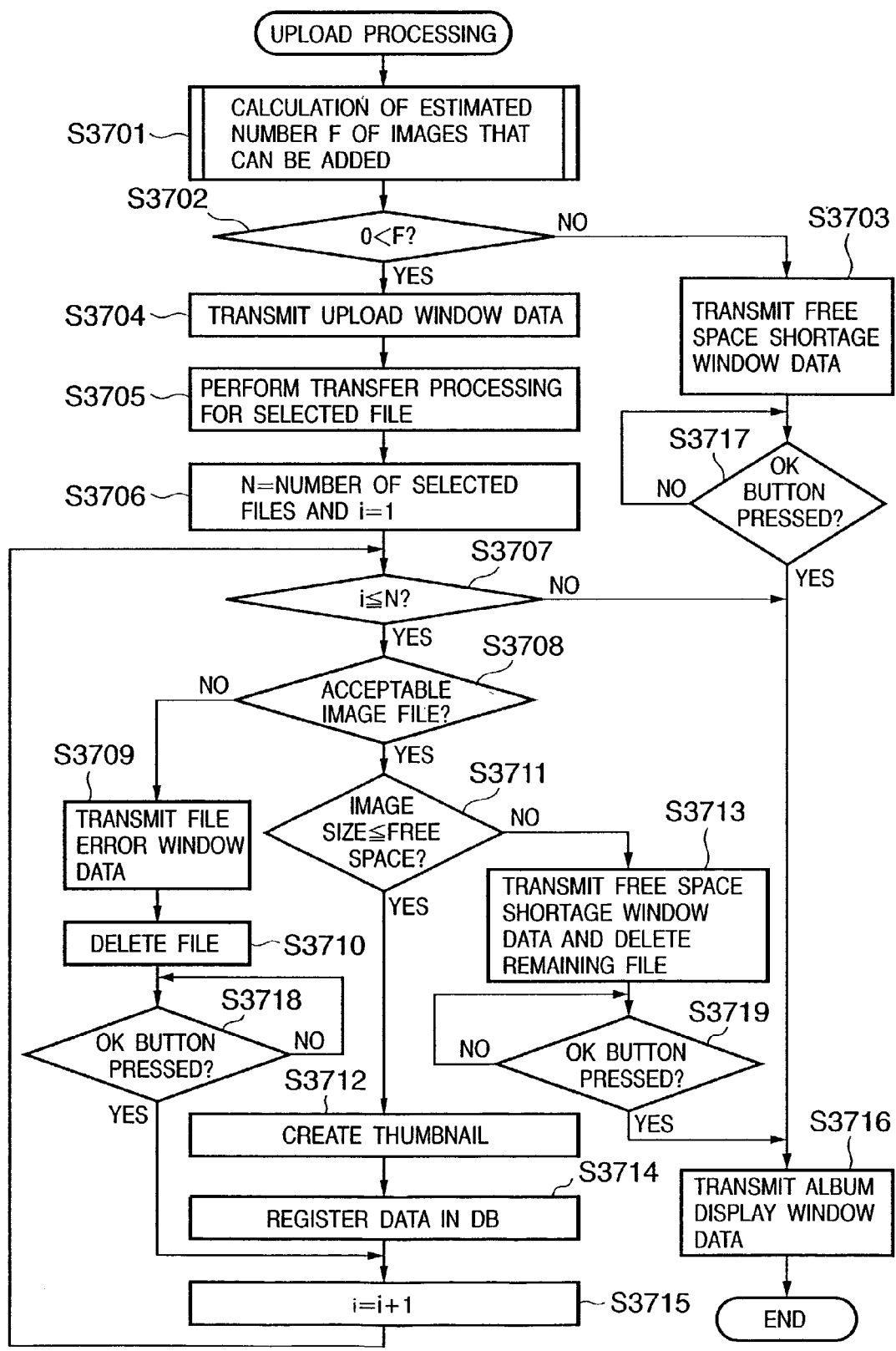
FIG. 28 is a flow chart for explaining image upload processing in the photosite server according to the embodiment of the present invention.

FIG. 28 is a flow chart showing a procedure for uploading (adding) an image to a currently displayed/edited album in the photosite server 105.

As described with reference to FIG. 22, when the user presses the upload button 2908 on the service provision initial window 2900, the photosite server 105 performs upload processing (step S3110 in FIG. 22).

Upon pressing of the button 2908, the number (F) of images (files) that can be uploaded is calculated in step S3701. The processing in step S3701 will be described later.

Figure 29:
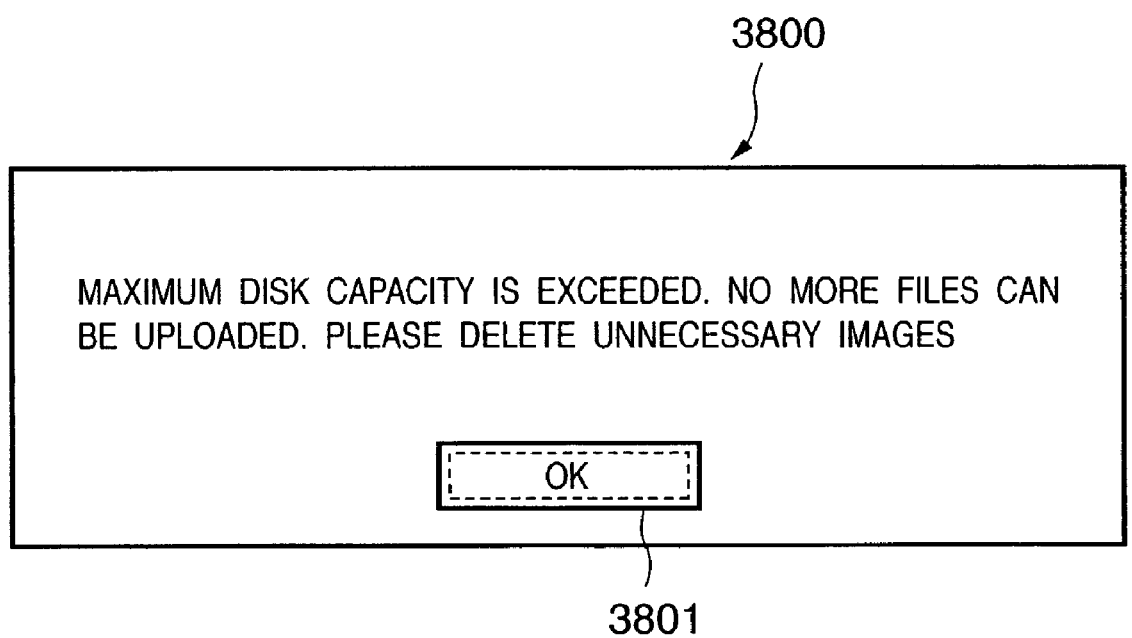
FIG. 29 is a view showing an example of the error window transmitted from the photosite server when the user is notified of disk free space shortage in the image upload processing in FIG. 28.

It is checked in step S3702 whether image data can be uploaded. This determination is done depending on whether F is an integer. If F is less than 1, since the user has already used up the usable storage capacity, it is determined that no image data can be uploaded, thereby transmitting free space shortage display window data for notifying the corresponding information is transmitted (step S3703). FIG. 29 shows an example of a free space shortage display window 3800 displayed on the user PC 102 on the basis of the window data transmitted in step S3703. If the pressing of an OK button 3801 on the window 3800 is detected in step S3717, the flow advances to step S3716 to transmit the display data (album display window data) of the service provision initial window 2900.

Figure 30:
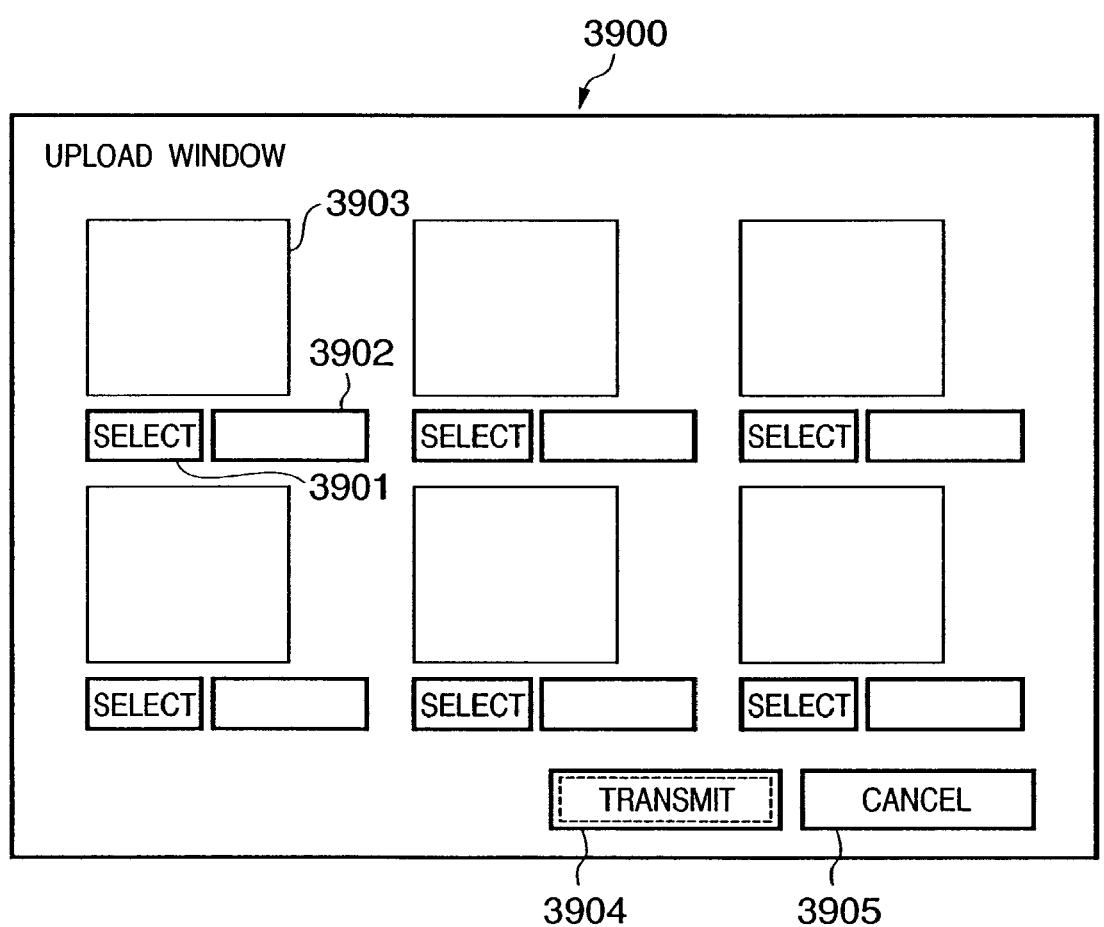
FIG. 30 is a view showing an example of the upload window transmitted from the photosite server in the image upload processing in FIG. 28.

If it is determined in step S3702 that F is 1 or more, for example, the display data of an upload window 3900 shown in FIG. 30 is transmitted in step S3704. The upload window 3900 functions as a user interface for allowing the user to select an image to be uploaded on the user PC 102. This upload window may be displayed as a window different from the service provision initial window 2900 or may be displayed in place of the service provision initial window 2900. The user can upload an image stored in the HDD or the like in the user PC 102 by using the upload window and add the image to the currently displayed/edited album.

On the upload window 3900, image sets, each constituted by three elements, namely a reference button 3901 for selection of an image file stored in the user PC 102, an input area 3902 for inputting a file path, and a preview display area 3903 for displaying a thumbnail image of a selected image, are displayed in number equal to the number (F) of images that can be uploaded which was calculated in step S3701.

The user selects an image to be uploaded by pressing the reference button 3901 using a file selection window (not shown) like the one used by a known GUI-based OS such as Windows (registered trademark) or directly inputting a file path in the user PC 102 into the input area 3902. In response to this operation, the user PC 102 opens the image file to display a thumbnail image in the preview display area 3903 on the browser window. Such processing on the user PC 102 side can be realized by using a known software technique such as JAVA applet.

When the user selects images in number equal to or less than the number F of images that can be uploaded and presses a transmission button 3904, the photosite server 105 performs transfer processing for the selected image files (step S3705). Although not shown, as is obvious, when a cancel button 3905 on the upload window 3900 is pressed, the upload processing is terminated, and the display data of the service provision initial window 2900 is transmitted as in step S3716.

The file transfer processing in step S3705 can be executed by using a protocol such as HTTP (REC1867) or FTP, as described above. The user may determine a protocol to be used in accordance with the software installed in the user PC 102 and photosite server 105.

The photosite server 105 temporarily stores the transferred image files in the image database 117.

In step S3706, the number of files transferred and 1 are assigned to the variables N and i, respectively.

It is checked in step S3707 whether i≦N. If i>N, the flow advances to step S3716 to transmit the display data of the service provision initial window 2900, and the upload processing is terminated.

Figure 31:
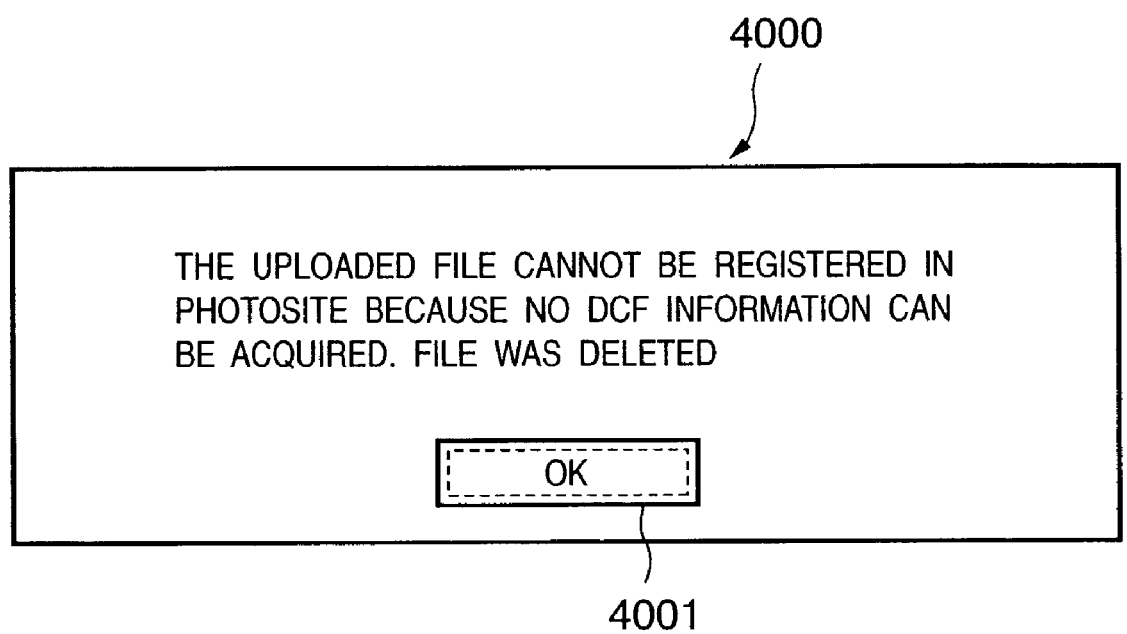
FIG. 31 is view showing an example of the error window transmitted from the photosite server upon detection of a file that cannot be handled in the image upload processing in FIG. 28.

If it is determined in step S3707 that i≦N, the flow advances to step S3708 to check whether the ith transferred file is an image file that can be handled by the photosite server 105. In this embodiment, the transferred file is determined as a file that can be used by the photosite server 105 only when the uploaded image is a JPEG file, and for example, digital camera photographing condition information (DCF information) in the DCF format which is recorded as the additional information of the image data can be extracted from its header portion. If the transferred file is anything other than the above file, for example, the display data of a file error window 4000 shown in FIG. 31 is transmitted in step S3709. On the file error window 4000 in FIG. 31, the user is simply notified of information indicating that the error file has been deleted. If, however, the user is also notified of the file name and the like, he/she can easily specify the error file.

When the error file is deleted in step S3710 and an OK button 4001 on the file error window 4000 is pressed in step S3718, the flow advances to step S3715. Note that the DCF information contains a shutter speed, information indicating whether electronic flash has been used or not, and the like. This information is used for color correction and the like when printing is done in the printsites 109A to 109C.

In the determination processing in step S3708, a given image file may be determined as a usable file only when desired additional information can be read out and it is also determined, on the basis of the information of the model of the digital camera used for photographing which is acquired from the product information contained in the additional information, that the image is photographed by the digital camera of the model registered in the digital camera model information list 7900. Alternatively, only an image file having a specific marker name written in its photographing device name may be determined as a file that can be uploaded. If it is determined that a given image file is anything other than the above file, the flow may advance to step S3709.

If it is determined in step S3708 that the ith transferred image file is an image file that can be handled by the photosite server 105, it is checked in step S3711 whether another file can be added. Since the number of images that can be added which is calculated in step S3701 is an estimated value, and in some case, only image files in number less than the estimated value can be actually added depending on variations in image data size and the like, it is checked in step S3711 whether another file can be actually added.

This determination is done by comparing the size of the currently processed image file with the maximum free space of the disk that can be used by the user. If free space≧image file size, it is determined that the file can be added. If free space<image file size, it is determined that the file cannot be added. Obviously, this determination can be done by other arbitrary methods, e.g., a method of comparing the total of the disk capacity that is currently used by the user and the size of the image file to be added with the maximum disk capacity that can be used.

If it is determined in step S3711 that the file cannot be added, for example, the display data of the free space shortage display window 3800 shown in FIG. 29 is transmitted as in step S3703. In addition, all the image files, including the image file to be added, which are not registered in the image database are deleted.

If the pressing of the OK button 3801 on the window 3800 is detected in step S3719, the flow advances to step S3716 to transmit the display data (album display window data) of the service provision initial window 2900.

If it is determined in step S3711 that the file can be added, a thumbnail display image and display image of the currently processed image file are created in step S3712 and registered in the database, together with the image information, in step S3714.

More specifically, 1) the currently processed image file and the created thumbnail image and display image are registered in the image database 117.

2) One record of the image information data table 900 is created and registered in the information database 118 in such a manner that the value obtained by adding one to the maximum image ID of all the image IDs registered so far is stored in the image ID 901 of the image; a file path to this image, in the original image file path 904; file paths to the thumbnail display image and display image created in step S3712, in the thumbnail file path 905 and display image file path 906, respectively; 0, in the image browse count 908; and 0, in the image print count 909.

3) One record of the album image data table 800 is created and registered in the information database 118 in such a manner that the album ID of the currently displayed album is stored in the album ID 801; the above image ID, in the image ID 802; and the value obtained by adding one to the number of pixels in the album, in the image display number 803.

When the registration processing in step S3714 is completed, the temporarily stored file corresponding to the registered image file is deleted, and i is incremented by one in step S3715, and the flow returns to step S3707.

The processing from step S3707 to step S3715 is repeated while i is equal to or more than N, thereby registering the uploaded image file in the database.

Calculation processing for the estimated number F of images that can be added which is performed in step S3701 in FIG. 28 will be described next with reference to the flow chart of FIG. 32.

First of all, in step S4101, the image information data table 900 in the information database 118 is searched to extract records having the user ID of the user who is currently performing operation. Let N be the number of corresponding records. In addition, 1 is assigned to the process variable i for image records, and 0 is assigned to a variable process Size for the calculation of the disk capacity used by the user.

It is then checked in step S4102 whether i≦N. If i≦N, the flow advances to step S4103 to acquire the size of the image file by using the original image file path 904 of the ith record found in step S4101.

In step S4104, the size of the image file acquired in step S4103 is added to the variable Size, and 1 is added to the variable i in step S4105.

By performing the processing from step S4103 to step S4105 while i≦N, the disk capacity used by the user can be calculated as the variable Size.

If it is determined in step S4102 that i>N, the customer state data table 500 in the information database 118 is searched by using the user ID of the user which is currently used, and the value of the maximum disk capacity 503 for the record is assigned to a variable Max_Size.

It is checked in step S4107 whether Size<Max_Size. If NO in step S4107, since there is no disk area that can be used by this user, 0 is assigned to the estimated number F of images that can be added in step S4108, and the processing is terminated.

If it is determined in step S4107 that Size<Max_Size, the customer state data table 500 is searched for a record corresponding to the user who is currently performing operation, and the value of the model ID 505 of a mainly used digital camera is acquired from the record in step S4109. A standard image size having this value as a model ID is acquired from the digital camera model information list 7900 and assigned to the variable S.

In step S4112, the estimated number F of images that can be added is calculated by dividing the remaining disk capacity that can be used by the user by the standard image size S obtained in step S4111. That is, $$F=(Max\_Size-Size)/S$$

In step S4113, the value F is converted into an integer by rounding up all digits to the right of the decimal point. With this operation, even if the free space is less than the average size of image files, uploading of one image file is permitted as long as the free space allow sit. Obviously, the value F can be converted into an integer by other arbitrary methods, e.g., a method of rounding up F to F=1 only when F<1, and rounding down all digits to the right of the decimal point when F>1.

Figure 32:
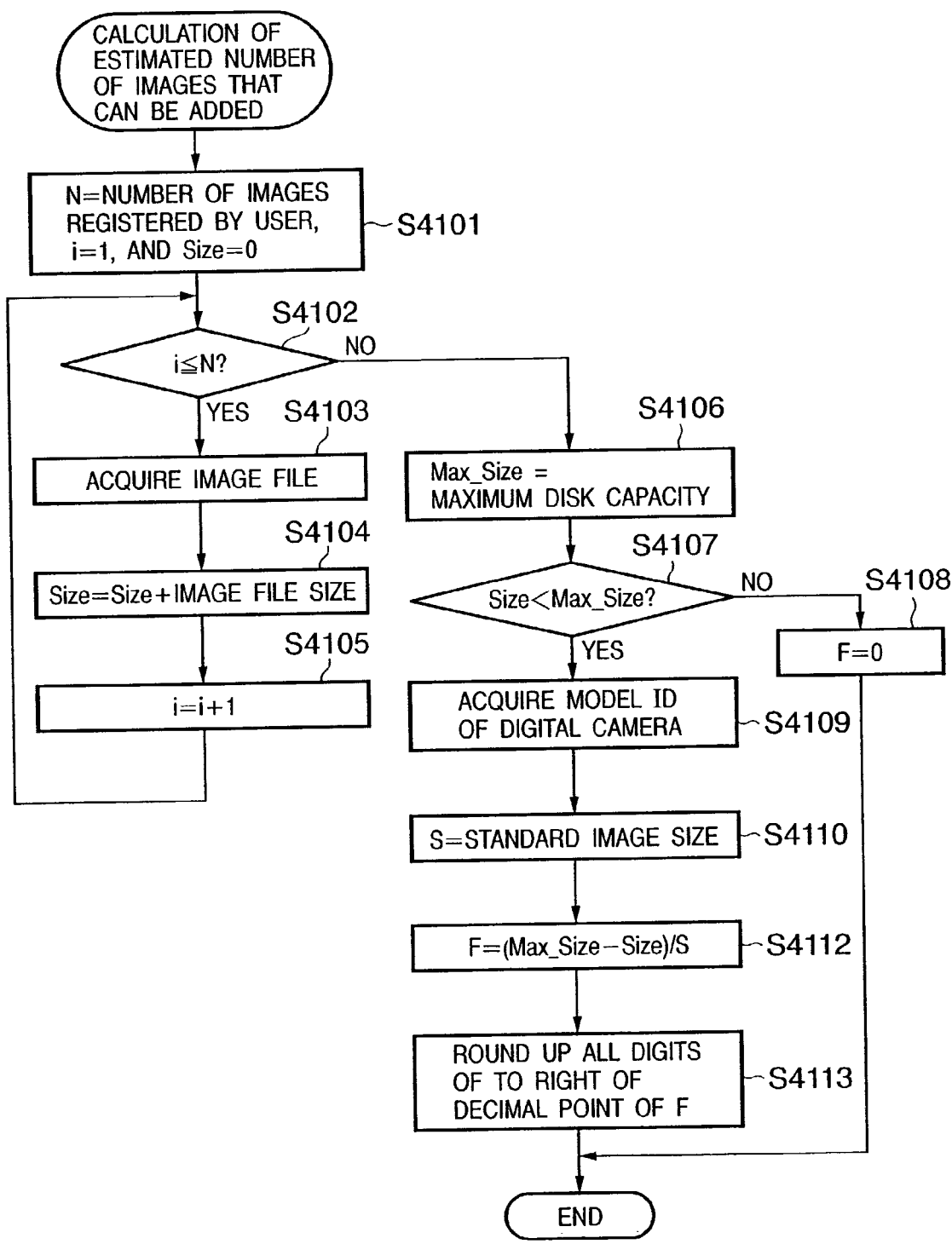
FIG. 32 is a flow chart for explaining processing in the step of calculating the estimated number of image files that can be added in the image upload processing in FIG. 28.

The flow chart of FIG. 32 has exemplified the case wherein every time upload processing is performed by the processing in steps S4101 to S4015, the number of user files that have already been registered and the disk capacity used are calculated. However, for example, the customer state data table 500 may have items for storing the number of files that have already been registered and/or the disk capacity used, and the data in these items may be updated at the time of image registration/deletion. This makes it possible to simplify the processing in steps S4101 to S4015 into processing of referring to the customer state data table 500.

In addition, this embodiment has exemplified the case wherein when the display data of an upload window is to be created, image selection areas (3901 to 3903) in number based on the estimated number of image files that can be uploaded are contained in the display data, thereby notifying the user of the number of images that can be uploaded.

However, other methods may be used. For example, the number of image selection areas on an upload window may be fixed, and for example, the message "the estimated number of images that can be uploaded: X images (remainder)" may be simply displayed on the upload window.

This embodiment has exemplified only the case wherein the user PC 102 is used as a device for transferring image files to the photosite server 105. However, an arbitrary device having the same function as that of the user PC 102 in the above embodiment can be used. As such devices which are currently available, portable terminals such as a PDA and cell phone can be enumerated. The present invention is also based on the use of other devices which will undergo feature expansion or will be newly developed in the future.

Only the digital still camera has been described as an image input apparatus. However, not only a digital camera but also a scanner apparatus or the like can be used as an image input apparatus in the present invention as long as the apparatus can automatically record additional information and the like unique to the apparatus on image data.

[Other Embodiment]

The above embodiment has exemplified only the photosite server formed from one device. However, the same function as that of the server apparatus of the present invention may be implemented by a system constituted by a plurality of devices.

The present invention also incorporates a case wherein a software program for implementing the function of the above embodiment (a program corresponding to at least one of the flow charts of FIGS. 11, 21, 22, 28, and 32) is supplied to a system or apparatus having a computer capable of executing the program from a recording medium directly or by wire/wireless communication, and a similar function is implemented by making the computer of the system or apparatus execute the supplied program.

The program codes themselves which are supplied and installed in the computer to allow the computer to implement the function/processing of the present invention also realize the present invention. That is, the computer program itself, which implements the function/processing of the present invention, is also incorporated in the present invention.

In this case, the program may take any form, e.g., an object code, a program executed by an interpreter, and script data supplied to an OS, as long as it has the function of the program.

As a recording medium for supplying the program, a floppy disc, a hard disc, a magnetic recording medium such as a magnetic tape, an optical/magneto optical storage medium such as an MO, a CD-ROM, a CD-R, CD-RW, DVD-ROM, DVD-R, or DVD-RW, a nonvolatile semiconductor memory, or the like can be used.

An example of the method of supplying the program by wire/wireless communication is a method of storing, in the server on the computer network, the computer program itself which implements the present invention or a data file (program data file) which can be a computer program for implementing the present invention in a client computer, e.g., a compressed file including an automatic installation function, and downloading the program data file to a connected client computer. In this case, the program data file can be divided into a plurality of segment files, and the segment files can be stored in different servers.

That is, the present invention incorporates a server apparatus which downloads the program data file for allowing a computer to implement the function/processing of the present invention to a plurality of users.

In addition, the following operation can be performed. The program of the present invention is encrypted and stored in a storage medium such as a CD-ROM. Such storage media are then distributed to users. A user who satisfies a predetermined condition is allowed to download key information for decryption from, for example, a home page through the Internet. The user executes the encrypted program by using the key information to make the computer install the program, thereby implementing the function/processing of the present invention.

The function of the above embodiment is realized not only when the readout program is executed by the computer but also when the OS or the like running on the computer performs part or all of actual processing on the basis of the instructions of the program.

The function of the above embodiment is also realized when the program read out from the storage medium is written in the memory of a function expansion board inserted into the computer or a function expansion unit connected to the computer, and the CPU of the function expansion board or function expansion unit or the like performs part or all of actual processing on the basis of the instructions of the program.

As has been described above, according to the server apparatus and its control method according to the present invention, a photosite server which can limit its use in accordance with the image input device used by a user and image data format and cope with various conditions required by a managing operator, and a control method for the server can be realized.

Furthermore, the present invention can be applied to the system comprising either a plurality of units or a single unit. It is needless to say that the present invention can be applied to the case which can be attained by supplying programs which execute the process defined by the present system of invention.

What is claimed is:

1. An image managing apparatus that communicates image files generated by a camera, with a user terminal via a network, comprising:
   a list storage unit that stores a model information list in which a predetermined model of a camera and an associated standard image size is registered;
   a calculating unit that calculates a number of image files to be allowed to be uploaded by a user of the user terminal, based on the standard image size associated to the predetermined model registered in the model information list, and a disk capacity associated with the user of the user terminal;
   a receiving unit that receives a plurality of image files generated by a camera from the user terminal, wherein the number of the image files is equal to or less than the number calculated by said calculating unit, and each of the image files includes information of a model of the camera by which the image file was generated;
   a model acquisition unit that acquires the information of the model of the camera from each of the received image files;
   a model determination unit that determines whether or not the information of the model of the camera acquired from each of the received image files matches the model registered in the model information list;
   a record generation unit that generates a record corresponding to each of the received image files for which the information of the model of the camera is determined by the model determination unit to match the predetermined model registered in the model information list; and
   a record storage unit that stores the generated record in a database.

2. The apparatus according to claim 1, wherein the model determination unit further determines whether or not each of the received image files complies with a DCF format.

3. The apparatus according to claim 1, further comprising an error notification unit that notifies an error to the user terminal from which the image files were received if the model determination unit determines that the information of the model of the camera acquired from at least one of the received image files doesn't match the predetermined model registered in the model information list.

4. The apparatus according to claim 1, further comprising:
- a thumbnail generation unit that generates a thumbnail image of the received image files for which the information of the model of the camera is determined by the model determination unit to match the predetermined model registered in the model information list; and
- an image storage unit that stores the received image file for which the information of the model of the camera is determined by the model determination unit to match the predetermined model registered in the model information list together with the generated thumbnail image in an image database.

5. A method for an image managing apparatus which communicates image files generated by a camera, with a user terminal via a network, comprising the steps of:
- a storing step of storing, in a list storage unit, a model information list in which a predetermined model of a camera and an associated standard image size is registered;
- a calculating step of calculating a number of image files to be allowed to be uploaded by a user of the user terminal, based on the standard image size associated to the predetermined model registered in the model information list, and a disk capacity associated with the user of the user terminal;
- a receiving step of receiving a plurality of image files generated by a camera from the user terminal, wherein the number of the image files is equal to or less than the number calculated by said calculating step, and each of the image files includes information of a model of the camera by which the image file was generated;
- a model acquisition step of acquiring the model of the camera from each of the received image files;
- a model determination step of determining whether or not the information of the model of the camera acquired from each of the received image files matches the model registered in the model information list;
- a record generating step of generating a record corresponding to each of the received image files for which the information of the model of the camera is determined by the model determination step to match the predetermined model registered in the model information list; and
- a record storing step of storing, in a record storage unit, the generated record in a database.

6. A computer-readable storage medium that stores a computer-readable program, the program for executing a method performed by an image managing apparatus that communicates image files generated by a camera, with a user terminal via a network, where the method comprises:
- a storing step of storing, in a storage unit, a model information list in which a predetermined model of a camera and an associated standard image size is registered;
- a calculating step of calculating a number of image files to be allowed to be uploaded by a user of the user terminal, based on the standard image size associated to the predetermined model registered in the model information list, and a disk capacity associated with the user of the user terminal;
- a receiving step of receiving a plurality of image files generated by a camera from the user terminal, wherein the number of the image files is equal to or less than the number calculated by said calculating step, and each of the image files includes information of a model of the camera by which the image file was generated;
- a model acquisition step of acquiring the information of the model of the camera from each of the received image files;
- a model determination step of determining whether or not the information of the model of the camera acquired from each of the received image files matches the model registered in the model information list;
- a record generating step of generating a record corresponding to the received image file for which the information of the model of the camera is determined by the model determination unit to match the predetermined model registered in the model information list; and
- a record storing step of storing, in a record storage unit, the generated record in a database.

7. The apparatus according to claim 1, wherein the list storage unit stores a plurality of model information lists and the apparatus further comprises:
- an obtaining unit that obtains, from the user terminal, information of a model of camera which is mainly used by the user and selected from among a plurality of predetermined models registered in the model information list,
- wherein said calculating unit calculates the number based on the standard image size associated to the model of the camera mainly used.

* * * * *